(12) United States Patent
Ozaki et al.

(10) Patent No.: US 7,136,975 B2
(45) Date of Patent: Nov. 14, 2006

(54) STORAGE SYSTEM, STORAGE CONTROL DEVICE, AND DATA RELAY METHOD USING STORAGE CONTROL DEVICE

(75) Inventors: Satoru Ozaki, Odawara (JP); Yoshihito Nakagawa, Ooi (JP); Hisao Homma, Odawara (JP); Kiichiro Urabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 370 days.

(21) Appl. No.: 10/766,850

(22) Filed: Jan. 30, 2004

(65) Prior Publication Data

US 2005/0120172 A1 Jun. 2, 2005

(30) Foreign Application Priority Data

Nov. 27, 2003 (JP) ............................. 2003-397380

(51) Int. Cl.
    *G06F 12/00* (2006.01)
(52) U.S. Cl. ........................................ 711/162; 707/204
(58) Field of Classification Search ................. 711/162
    See application file for complete search history.

(56) References Cited

U.S. PATENT DOCUMENTS

| | | | |
|---|---|---|---|
| 5,787,459 A * | 7/1998 | Stallmo et al. ............ | 711/112 |
| 6,209,002 B1 | 3/2001 | Gagne et al. | |
| 6,237,008 B1 | 5/2001 | Beal et al. | |
| 6,253,292 B1 | 6/2001 | Jhang et al. | |
| 6,282,610 B1 * | 8/2001 | Bergsten ................. | 711/114 |
| 6,389,240 B1 | 5/2002 | Toyohara et al. | |
| 6,687,718 B1 * | 2/2004 | Gagne et al. ............ | 707/204 |
| 2003/0110157 A1 | 6/2003 | Maki et al. | |
| 2003/0191917 A1* | 10/2003 | McBearty et al. ........ | 711/162 |
| 2004/0006587 A1 | 1/2004 | McConnell et al. | |
| 2004/0186898 A1 | 9/2004 | Kimura et al. | |
| 2004/0205145 A1 | 10/2004 | Murakami | |

FOREIGN PATENT DOCUMENTS

JP        11-338646        12/1999

* cited by examiner

*Primary Examiner*—Brian R. Peugh
*Assistant Examiner*—Hashem Farrokh
(74) *Attorney, Agent, or Firm*—Mattingly, Stanger, Malur & Brundidge, P.C.

(57) ABSTRACT

A plurality of virtual volumes with different control functions are associated with one real volume and remote copying is conducted. A relay system comprises a plurality of virtual volumes V12, V21 mapped to the same real volume R1. A virtual volume V21 for transmission control is mapped to a real volume R1, a real volume R2 is mapped to the virtual volume V21, and the virtual volume V12 for reception control is mapped to the real volume R2. If a command is received from a local system 10, the virtual volume V12 for reception control writes data into the virtual volume V21 via the real volume R2 (virtual entity). The virtual volume V21 transmits the data to a copy destination volume V22 and writes the data into the real volume R1.

12 Claims, 16 Drawing Sheets

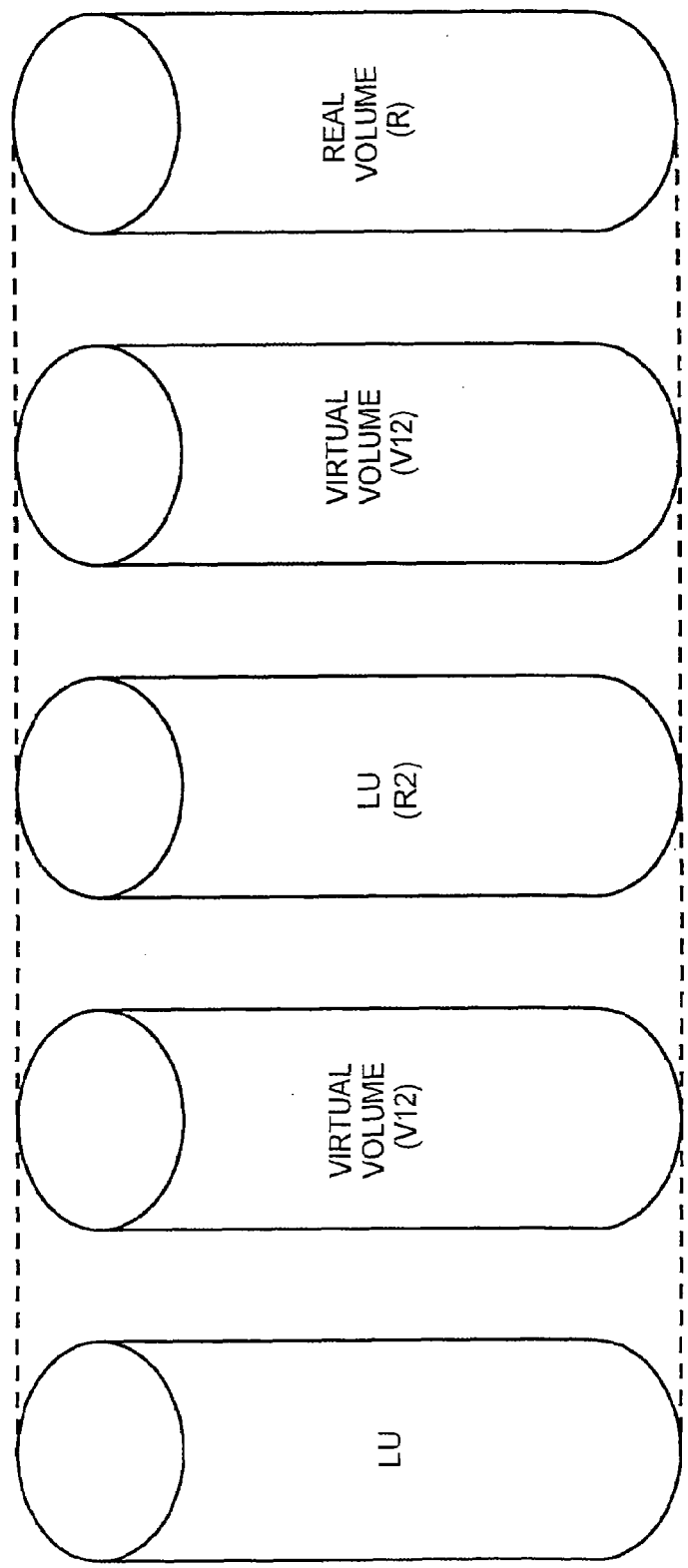

FIG. 4(a)

| VIRTUAL VOLUME - REAL VOLUME MAPPING TABLE | | |
|---|---|---|
| VIRTUAL VOLUME NUMBER #V | 0 | REAL VOLUME ADDRESS |
| | | VIRTUAL VOLUME ADDRESS |
| | | MULTIPLE VIRTUALIZATION DECISION INFORMATION |
| | 1 | REAL VOLUME ADDRESS |
| | | VIRTUAL VOLUME ADDRESS |
| | | MULTIPLE VIRTUALIZATION DECISION INFORMATION |
| | 2 | REAL VOLUME ADDRESS |
| | | VIRTUAL VOLUME ADDRESS |
| | | MULTIPLE VIRTUALIZATION DECISION INFORMATION |
| | ⋮ | ⋮ |

| LU - VIRTUAL VOLUME MAPPING TABLE | | |
|---|---|---|
| VIRTUAL VOLUME NUMBER #LU | 0 | VIRTUAL VOLUME NUMBER |
| | | START ADDRESS IN VIRTUAL VOLUME |
| | | LU SIZE |
| | 1 | VIRTUAL VOLUME NUMBER |
| | | START ADDRESS IN VIRTUAL VOLUME |
| | | LU SIZE |
| | 2 | VIRTUAL VOLUME NUMBER |
| | | START ADDRESS IN VIRTUAL VOLUME |
| | | LU SIZE |
| | ⋮ | ⋮ |

| LU#-V# CONVERSION TABLE | | T3 |
|---|---|---|
| LU# | V# | |
| 0 | 0 | |
| 1 | 1 | |
| 2 | 2 | |
| ⋮ | ⋮ | |

FIG. 5(b)

| | ADDRESS CONVERSION TABLE | | T4 |
|---|---|---|---|
| VIRTUAL VOLUME NUMBER #V | 0 | WWN# / LU# | |
| | | START LBA/MaxLBA | |
| | | VOLUME ATTRIBUTE | |
| | 1 | WWN# / LU# | |
| | | START LBA/MaxLBA | |
| | | VOLUME ATTRIBUTE | |
| | 2 | WWN# / LU# | |
| | | START LBA/MaxLBA | |
| | | VOLUME ATTRIBUTE | |
| | 3 | WWN# / LU# | |
| | | START LBA/MaxLBA | |
| | | VOLUME ATTRIBUTE | |
| | ⋮ | ⋮ | |

STORAGE SYSTEM, STORAGE CONTROL DEVICE, AND DATA RELAY METHOD USING STORAGE CONTROL DEVICE

BACKGROUND OF THE INVENTION

1. Cross References to Related Application

This application relates to and claims priority from Japanese Patent Application No. 2003-397380 filed on Nov. 27, 2003, the entire disclosure of which is incorporated herein by reference.

2. Field of the Invention

The present invention relates to a storage system, a storage control device, and a data relay method using the storage control device.

3. Description of the Related Art

For example, in a database system handling large scale data, such as information management systems of data centers or enterprises, the data are managed by using a storage system configured separately from a host computer. This storage system is constituted, for example, by disk array devices. A disk array device is configured by arranging a multiplicity of storage devices in the form of an array and is constructed based, for example, on RAID (Redundant Array of Independent Inexpensive Disks). A storage device group is constituted, for example, by hard disk devices or semiconductor memory devices and is connected by a SAN (Storage Area Network) or the like. At least one logical volume (logical unit) is formed on a physical storage area provided by the storage device group, and this logical volume is provided to the host computer. The host computer can conduct data writing/reading to/from the logical volume.

In the storage system, data loss is prevented and continuous operation is ensured by taking a variety of protection measures. One of them is the utilization of a RAID configuration. For example, the possibility of data loss can be reduced when the disk array device employs, for example, a redundant storage structure known as RAID 1 to RAID 6. Furthermore, duplication of physical configuration is also conducted in the disk array system. For example, in the disk array system, multiplexing is attained by providing a plurality of main components such as high-order interface circuits for conducting data communication with a host computer and low-order interface circuits for conducting data communication with disk drives. Furthermore, there are also provided a plurality of communication paths connecting the above-mentioned respective main components and a plurality of power sources for supplying electric power to the main components.

Furthermore, in the disk array devices, for example, the logical volumes of the RAID structure can be duplicated and the respective identical data can be stored in a pair of logical volumes, primary volume and auxiliary volume.

In recent years, remote systems have been sometimes provided in locations physically separated by a large distance from a local system, as a provision against unexpected situations such as natural disasters, this measure known as a disaster recovery. A copy of the primary volume used in the local system is stored in the remote system. Data can be transmitted from the local system to the remote system without using a host computer, and an auxiliary volume having the contents identical to that of the primary volume of the local system can be created in the remote system.

Data copying is conducted in two stages to match the contents of the primary volume and auxiliary volume. One stage is initial copying. In initial copying, the storage contents of the primary volume is copied in its entirety to the auxiliary volume. The other stage is differential copying. In differential copying, only data updated in the primary volume of the local system after the completion of initial copying is transferred to the auxiliary volume of the remote system. When the local system stops functioning due to a natural disaster or intentional attack, the operations of the local system are continued by the remote system till the local system is restored. The technology for copying the storage contents of a local disk device to an external disk device located at a distance from the local disk device is known as mirroring or remote copying (Japanese Patent Application Laid-open No. H11-338646).

Remote copying can be generally classified into synchronous and asynchronous remote copying. In the case of synchronous remote copying, after the data received from the host computer has been stored in a cache memory, this data is transferred to the remote system via a communication network (SAN, IP network, or the like). If the remote system receives the data and stores it in a cache memory, a response signal indicating data reception is transmitted to the local system. If the local system receives a response signal from the remote system, it posts to the host computer a write completion report notifying that the data writing was normally conducted. Thus, in the synchronous remote copying, the write request from the host computer and data transfer to the remote system are executed synchronously. Therefore, because a delay corresponding to a time period waiting for a response from the remote system occurs, such copying is suitable when the distance between the local system and remote system is comparatively short. Conversely, when the local system and remote system are at a large distance from each other, the synchronous remote copying is generally unsuitable because of the problems associated with response delay and propagation delay.

On the other hand, in the case of asynchronous remote copying, if the local system receives a write request from the host computer, it stores the received data in a cache memory and immediately sends a write completion report to the host computer. After sending the write completion report to the host computer, the local system transfers the data to the remote system. Thus, reporting the write completion to the host computer and transferring the data to the remote system are conducted asynchronously. Therefore, in the case of the asynchronous remote copying, the write completion report can be rapidly transmitted to the host computer, regardless of the distance between the local system and remote system. Therefore, the asynchronous remote copying is applicable to the cases when the local system and remote system are at a large distance from each other. However, in the case of an asynchronous remote copying, data transfer to the remote system has not yet been conducted when the write completion report is sent to the host computer. Therefore, though the write completion report has been sent, it cannot be guaranteed that the storage contents of the primary volume and the storage contents of the auxiliary volume are matched.

Synchronization of the storage contents of the local system and remote system is a measure for coping with the occurrence of natural disasters and increases the reliability of the storage system. For example, considering the occurrence of large-scale natural disasters affecting a wide area, such as large earthquakes, it is preferred that the local system and remote system be as far from each other as possible. This is because the shorter is the distance between the local system and the remote system, the higher is the probability that it will be impossible to cope with wide-area failure.

On the other hand, because of physical limitations of the communication path between the local system and remote system, the distance between the local system and remote system is naturally also limited. For example, when fiber channel transfer is conducted by using an optical fiber cable, the distance at which communication is possible is about several tens of kilometers, the specific distance depending on the aperture and mode of fiber cable and the like. Therefore, when data is transmitted over a large distance by using fiber channel transfer by an optical fiber cable, a relay system is disposed between the local system and remote system. Introducing a relay system makes it possible to increase, for example to double, the distance between the local system and remote system.

Furthermore, when the copy of data is saved only in one remote system, if by any chance the data copy of the remote system is lost due to some failure after the local system has stopped functioning, a long time will be required to restore the storage system. Therefore, it is preferred that the measures taken are not limited to disaster recovery and that the copies of the primary volume are saved in multiple locations.

If a relay system is disposed between the local system and the remote system, then the data of the local system can be saved in both the relay system and the remote system and the reliability is improved. Furthermore, because the distance between the local system and remote system is increased, the resistance to wide-range obstacles such as large earthquakes is also increased.

Further, in a storage system, as the system expands, old storage control devices are present together with new storage control devices. Accordingly, it is desirable that the new storage control devices and old storage control devices be employed in cooperation with each other.

The present invention was created to resolve the aforesaid problems and it is an object of the present invention to provide a storage system, a storage control device, and a data relay method using the storage control device that are comparatively inexpensive and can save a copy of a volume in a plurality of locations. It is another object of the present invention to provide a storage system, a storage control device, and a data relay method using the storage control device that can establish cooperation between a plurality of different storage control devices and realize a plurality of remote copies. Other objects of the present invention will be evident from the description of the preferred embodiments thereof provided hereinbelow.

SUMMARY OF THE INVENTION

The storage system in accordance with the present invention, which is designed to resolve the aforesaid problems, is capable of transmitting the data stored in a first storage control device to a third storage control device via a second storage control device. The second storage control device comprises a first virtual volume which is associated with a real volume and forms a pair with a copy source volume of the first storage control device, a second virtual volume which is associated with the real volume and forms a pair with a copy destination volume of the third storage control device, a first target port having the input side thereof connected to the copy source volume and the output side thereof connected to the first virtual volume, a first initiator port having the input side thereof connected to the first virtual volume, a second target port having the input side thereof connected to the first initiator port and the output side thereof connected to the second virtual volume, a second initiator port having the input side thereof connected to the second virtual volume and the output side thereof connected to the copy destination volume, a first control program for causing the first virtual volume to operate as an auxiliary volume of the copy source volume, a second control program for reflecting the storage contents of the first virtual volume in the storage contents of the second virtual volume, and a third control program for causing the second virtual volume to operate as the primary volume of the copy destination volume, wherein the real volume is mapped to the second virtual volume, and the second virtual volume is mapped to the first virtual volume.

Examples of storage control devices include disk array devices and highly functional fiber channel switches. Examples of host devices include a variety of computer devices such as personal computer, servers, and mainframes. The first storage control device and the second storage control device, and the second storage control device and the third storage control device can be bidirectionally communicably connected via respective communication networks. Examples of communication networks include SAN, LAN (Local Area Network), special lines, and internet. The first to third storage control devices may be disposed in respective separate sites or may be disposed in the same site. Alternatively, the first storage control device and the second storage control device can be disposed in the same site, and the third storage control device can be placed in a separate site. Furthermore, the second storage control device and the third storage control device can be disposed in the same site, and the first storage control device can be disposed in a separate site.

The second storage control unit realizes two functions. One is a remote copy relay function. The remote copy relay function is a function of transmitting the entire data where the copy source volume of the first storage control device is stored, or part thereof, to the third storage control device via the second storage control device. Another function is a volume copy function. The second storage control device is provided with the first virtual volume for forming a pair with the copy source volume. Therefore, the storage contents of the copy source volume is saved in two places, the first virtual volume and the copy destination volume, and the reliability of the storage system is increased.

The second storage control device has a first virtual volume and a second virtual volume. Those virtual volumes are associated with the same real volume. The first virtual volume forms a pair with the copy source volume, and the second virtual volume forms a pair with the copy destination volume. Further, the first virtual volume and the second virtual volume also form a pair. The volume pair as referred to herein means that storage contents of corresponding volumes are matched.

The first virtual volume realizes a reception function of receiving data from the copy source volume by the first control program. Further, the second virtual volume realizes a transmission function of transmitting data to the copy destination volume by the third control program. Synchronization of the storage contents of the first virtual volume and second virtual volume is conducted by the second control program. Thus, multiple virtual volumes with different control functions are formed on a single real volume. Further, the real volume is mapped to the second virtual volume, and the second virtual volume is mapped to the first virtual volume. Thus, figuratively speaking, the second virtual volume and first virtual volume are stacked in the order of description on the real volume.

The first virtual volume receives data from the copy source volume via the first target port. The first virtual volume and the second virtual volume are connected via the first initiator port and second target port. The first initiator port and second target port are located in the same case and are connected by a cable such as an optical fiber cable or a metal cable. The second virtual volume transmits data to the copy destination volume via the second initiator port.

Thus, data is transmitted from the first storage control device to the third storage control device via the second storage control device. Further, the copy of the copy source volume is placed in both the second storage control device and the third storage control device. Copying from the first storage control device to the second storage control device can be also called the first remote copying, and copying from the second storage control device to the third storage control device can be also called the second remote copying.

BRIEF DESCRIPTION OF THE DRAWINGS

FIG. 3 is an explanatory drawing illustrating schematically how a plurality of virtual volumes are mapped to one real volume;

FIG. 4A shows a mapping table for mapping virtual volumes and real volumes;

FIG. 4B is a mapping table for mapping LU and virtual volumes;

FIG. 5A is a conversion table for converting LU numbers into virtual volume numbers;

FIG. 5B is an address conversion table for converting addresses of virtual volumes into addresses of real volumes;

DESCRIPTION OF THE PREFERRED EMBODIMENTS

Figure 1:
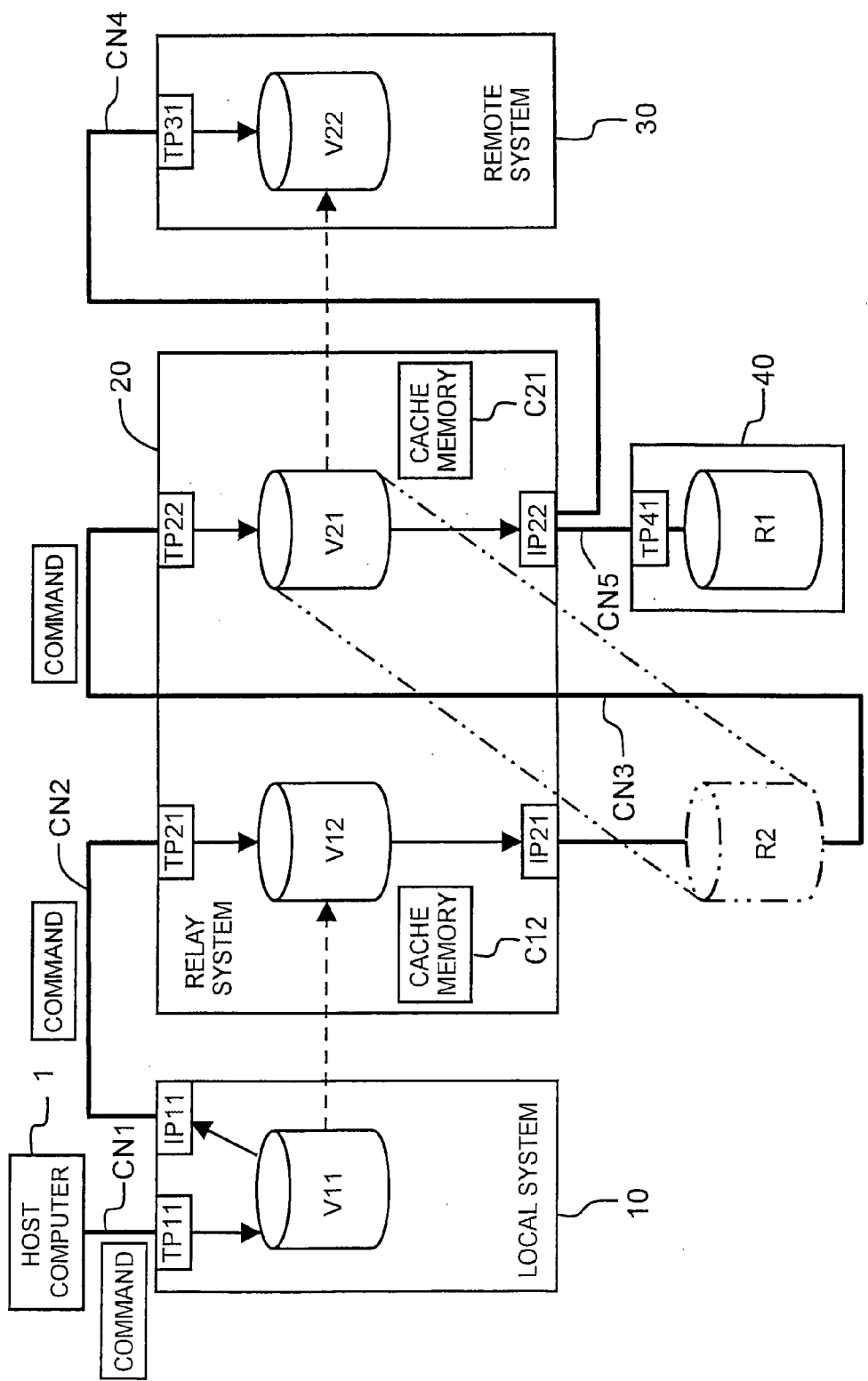
FIG. 1 is a block diagram illustrating the outline of the entire storage system of a first embodiment of the present invention.

Embodiments of the present invention will be described hereinbelow based on FIGS. 1 through 16. The present embodiments, for example, relate to a storage system in which data stored in a first storage control device can be transmitted to a third storage control device via a second storage control device, wherein the second storage control device comprises a first virtual volume which is associated with the real volume and forms a pair with the copy source volume of the first storage control device, a second virtual volume which is associated with the real volume and forms a pair with the copy destination volume of the third storage control device, a first control unit for reflecting the storage contents of the copy source volume in the storage contents of the first virtual volume, a second control unit for reflecting the storage contents of the first virtual volume in the storage contents of the second virtual volume, and a third control unit for reflecting the storage contents of the second virtual volume in the storage contents of the copy destination volume.

The second control unit can reflect the storage contents of the first virtual volume in the storage contents of the second virtual volume by copying the data stored in the first virtual volume to the second virtual volume via a communication path connecting an initiator port and target port present in the same housing.

There can be further provided a first cache memory which is associated with the first virtual volume for temporarily storing data that will be stored in the first virtual volume and a second cache memory which is associated with the second virtual volume for temporarily storing data that will be stored in the second virtual volume, and the second control unit can reflect the storage contents of the first virtual volume in the storage contents of the second virtual volume by copying the data stored in the first cache memory to the second cache memory.

There can be further provided a second cache memory which is associated with the second virtual volume for temporarily storing data that will be stored in the second virtual volume, and the second control unit can reflect the storage contents of the first virtual volume in the storage contents of the second virtual volume by directly copying the data to be written to the first virtual volume to the second cache memory.

Furthermore, the present embodiments also disclose a second storage control device capable of transmitting the data stored in the first storage control device to the third storage control device, this second storage control device comprising a first virtual volume which is associated with the real volume and forms a pair with the copy source volume of the first storage control device, a second virtual volume which is associated with the real volume and forms a pair with the copy destination volume of the third storage control device, a first control unit for reflecting the storage contents of the copy source volume in the storage contents of the first virtual volume, a second control unit for reflecting the storage contents of the first virtual volume in the storage contents of the second virtual volume, and a third control unit for reflecting the storage contents of the second virtual volume in the storage contents of the copy destination volume.

Here, the real volume can be mapped to the second virtual volume, and the second virtual volume can be mapped to the first virtual volume.

Further, the first virtual volume and second virtual volume can be independently associated with the real volume.

The second control unit can reflect the storage contents of the first virtual volume in the storage contents of the second virtual volume by copying the data stored in the first virtual volume to the second virtual volume via a communication path connecting the initiator port and target port located in the same housing.

The real volume may be present outside the second storage control device. Thus, the external real volume can be effectively used by mapping the real volume of a separate storage control device located outside to the second virtual volume.

Here, at least either the first virtual volume or second virtual volumes can be provided in a plurality.

For example, a plurality of second virtual volumes can be provided and each second virtual volume can respectively form a pair with different copy destination volumes. Alternatively, a plurality of first virtual volumes can be provided and each first virtual volume can respectively form a pair with different copy source volumes. In this case, for example, one real volume may be prepared for each system of remote copying.

The first control unit, second control unit, and third control unit can be mounted on respective channel adapters for controlling data communication with a host device.

Further in the present preferred embodiment, there is also disclosed a data relay method using a storage control device for transmitting the data stored in a first storage control device to a third storage control device via a second storage control device. This data relay method comprises the steps of setting a first virtual volume and a second virtual volume, each being associated with a real volume, into the second storage control device, forming a first pair from the first virtual volume and the copy source volume of the first storage control device, forming a second pair from the second virtual volume and the copy destination volume of the third storage control device, synchronizing the storage contents of the copy source volume and the first virtual volume, synchronizing the storage contents of the first virtual volume and the second virtual volume, and synchronizing the storage contents of the second virtual volume and the copy destination volume.

First Embodiment

The first embodiment will be described below based on FIGS. 1 through 6. FIG. 1 is a block diagram illustrating the outline of the storage system. The present storage system, as will be described hereinbelow, comprises a host computer 1, a local system 10 serving as a first storage control device, a relay system 20 serving as a second storage control device, a remote system 30 serving as a third storage control device, and another storage control device 40.

The host computer 1 is a computer device comprising information processing resources such as a CPU (Central Processing Unit) or a memory, and is constituted, for example, by a personal computer, a workstation, a server, a mainframe, or the like. The host computer 1 comprises an information input device (not shown in the figures) such as a keyboard switch, a pointing device, a microphone, or the like, and an information output device (not shown in the figures) such as a monitor display, a speaker, or the like. Furthermore, the host computer 1 is also provided with an application program (not shown in the figures) such as a database software for using a storage area provided by the local system 10, and an adapter (not shown in the figures) for accessing the local system 10 via a communication network CN1.

The host computer 1 is connected to the local system 10 via the communication network CN1. For example, a SAN can be used as the communication network CN1. However, a LAN is not always necessarily used, and internet, or a special circuit may be also used. When a SAN is used, the transmission can be conducted in block units following the fiber channel protocol. When a LAN is used, the transmission can be conducted in file units following the TCP/IP (Transmission Control Protocol/Internet Protocol). When internet is used, for example, a command set of SCSI (Small Computer System Interface) can be serialized as TCP/IP packets. Alternatively, there is also a method for transmitting according to the TCP/IP by capsuling the fiber channel frame. Note that although the host computer 1 shown in the figure is connected only to the local system 10, such a configuration is not always necessary and the host computer 1 may be also connected to the relay system 20 and remote system 30.

The local system 10 is configured, for example, as a disk array subsystem. The local system 10 can use a copy source volume V11. The copy source volume V11 can be configured as a logical unit or logical volume and can be recognized from the host computer 1. A LUN (Logical Unit Number) is allocated to the copy source volume V11. The copy source volume V11 can be virtually provided on the real volume (not shown in the figure) in the local system 10. Alternatively, the copy source volume V11 can be also formed by mapping the real volume (not shown in the figures) located outside the local system 10 to an intermediate storage hierarchy (also called a VDEV).

The local system 10 receives commands from the host computer 1 via a target port T11. Further, the local system 10 transmits commands to the remote system 30 via an initiator port IP11. The term "initiator" here means the control side, and the term "target" means the controlled side. Commands for controlling separate devices are transmitted from the initiator port, and the commands from the host device are inputted into the target port. The host computer 1 can read the data stored in the copy source volume V11 or write the data by transmitting a read command or a write command to the local system 10. If the copy source volume V11 is updated, a write command is transmitted from the IP11 to the relay system 20. If the relay system 20 receives a write command from the local system 10, it updates the internal virtual volume V21 and also transmits a write command to the remote system 30. As a result, the volume having the storage contents identical to the storage contents of the copy source volume V11 is formed in the relay system 20 and remote system 30.

The relay system 20 is configured, for example, as a disk array subsystem. The relay system 20 comprises a first virtual volume V12 and a second virtual volume V21 associated with the same real volume R1. The real volume R1 is provided inside a separate storage control device 40 located outside the relay system 20. Further, as will be described below, the real volume R1 can be also provided inside the relay system 20. Furthermore, the relay system 20 also comprises a first cache memory C12 and a second cache memory C21. The first cache memory C12 is associated with the first virtual volume V12 and stores temporarily the data for the first virtual volume V12. The second cache memory C21 is associated with the second virtual volume V21 and stores temporarily the data for the second virtual volume V21.

The first virtual volume V12 forms a pair with the copy source volume V11 of the local system 10. In other words, a first remote copy pair is formed for which the copy source volume V11 is considered as a primary volume and the first virtual volume V12 is considered as an auxiliary volume. The second virtual volume V21 forms a pair with the copy destination volume V22 of the remote system 30. In other words, a second remote copy pair is formed for which the second virtual volume V21 is considered as a primary volume and the copy destination volume V22 is considered as an auxiliary volume. Thus, as described below, the storage contents of the respective virtual volumes V12 and V22 are also made to synchronize with each other. Further, as will be described hereinbelow, the second virtual volume V21 can be recognized from the outside by being associated with (by mapping to) a virtual real volume R2. Further, the first virtual volume V12 can be recognized from the outside by being associated with a logical unit (not shown in the figures).

On the other hand, focusing attention on the configuration of the communication path, a first target port TP21 is connected to the initiator port IP11 of the local system 10 via a communication network CN2. The output side of the first target port TP21 is connected to the first virtual volume V12. The communication network CN2 is constituted, for example, by a SAN. A command from the local system 10 is received by the first target port TP21 from the initiator port IP11 via the communication network CN1.

A first initiator port IP21 is connected by the input side thereof to the first virtual volume V12 and by the output side thereof to a second target port TP22 via a communication network CN3. The communication network CN3 is constituted, for example, by a SAN. A cable constituting the communication network CN3 is, for example, arranged to pass the outside of the relay system 20. A message transmitted from the first virtual volume V12 to the second virtual volume V21 is received by the second target port TP22 from the first initiator port IP21 via the communication network CN3.

The output side of the second target port TP22 is connected to the second virtual volume V21. The second initiator port IP22 is connected by the input side thereof to the second virtual volume V21 and by the output side thereof to a target port TP31 of the remote system 30 via a communication network CN4. The communication network CN4 is constituted, for example, by a SAN or internet. A command from the second virtual volume V21 is received by the target port TP31 of the remote system 30 from the initiator port IP22 via the communication network CN4.

The remote system 30 is configured, for example, as a disk array subsystem. The remote system 30 can use a copy destination volume V22. The copy destination volume 22 is configured as a logical unit or logical volume and is a logical storage device that can be recognized from another device (relay system 20 or the like). A LUN is allocated to the copy destination volume V22. The copy destination volume V22 forms a pair with the second virtual volume V21. The copy destination volume V22 can be virtually provided on a real volume (not shown in the figures) in the remote system 30. Alternatively, the copy destination volume V22 can be also formed by mapping the real volume (not shown in the figure) located outside of the remote system 30 to an intermediate storage hierarchy. If the remote system 30 receives a write command from the relay system 20 via the target port TP31, it writes and updates data in the copy destination volume V22.

The other storage control device 40 is used for providing a real volume R1 to the relay system 20. In other words, the storage control device 40 is used as a provision source of physical storage areas. A target port TP41 of the storage control device 40 is connected to the initiator port IP22 of the relay system 20 via a communication network CN5. The communication network CN5 is constituted, for example by a SAN. The real volume R1 is mapped to the second virtual volume V21, and the second virtual volume V21 is mapped to the second real volume R2, this mapping being described hereinbelow in greater detail. The second real volume R2 is mapped to the first virtual volume V12.

Here, the second real volume R2 is a virtual entity and has no physical entity. The second real volume R2 has the second virtual volume V21 mapped thereto and is linked to the first real volume R1 via the second virtual volume V21. Therefore, the entity of the second real volume R2 is the first real volume R1.

Figure 2:
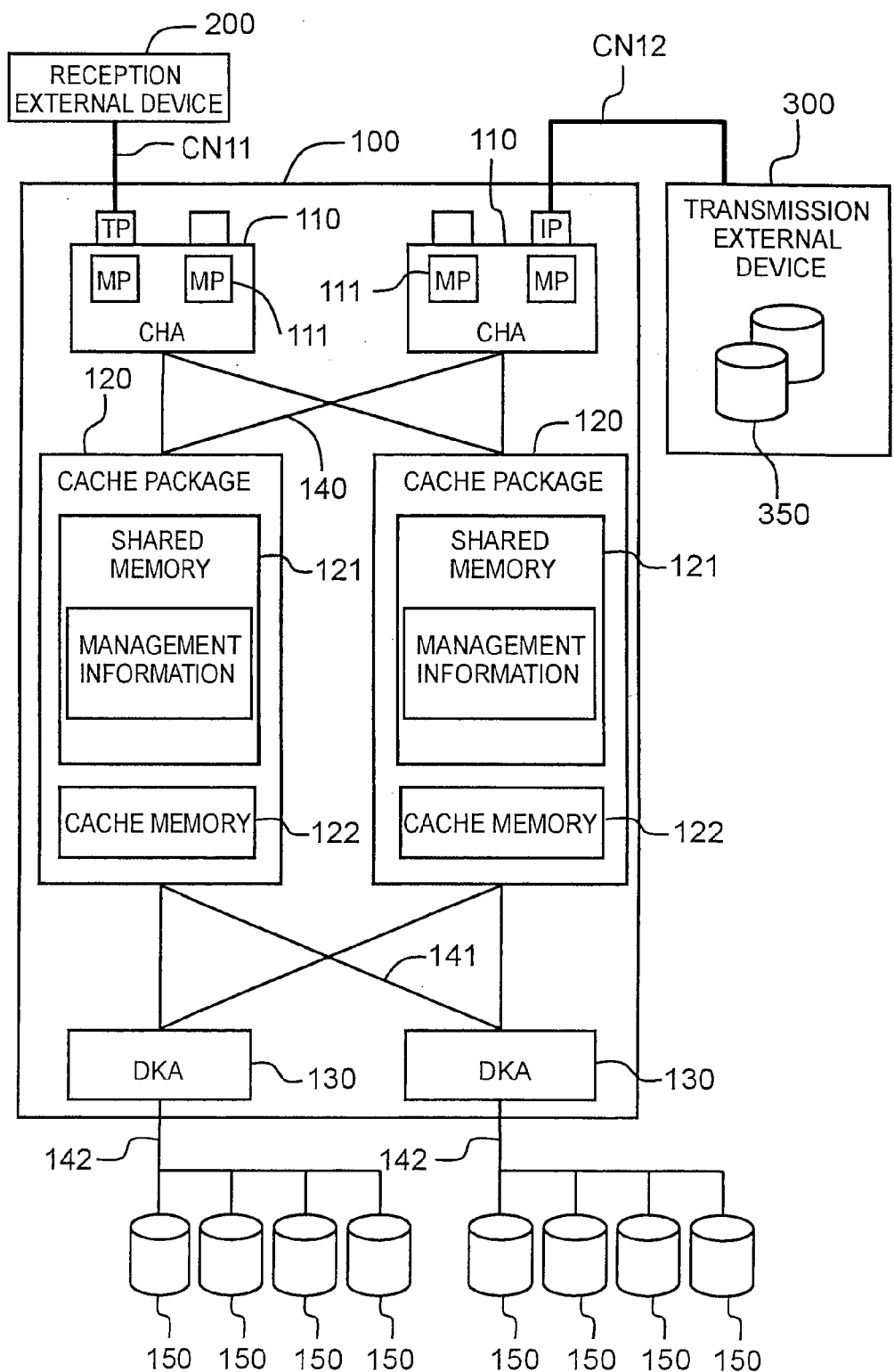
FIG. 2 is a block diagram illustrating a schematic configuration of a disk array system that can be used in the local system, relay system, and remote system.

FIG. 2 is a block diagram illustrating an example of the disk array subsystem. The disk array subsystem shown in FIG. 2 can be used in the local system 10, relay system 20, and remote system 30.

The disk array subsystem 100 can be connected to the reception external device (host device) 200 via a communication network CN11. Furthermore, the disk array subsystem 100 can be connected to a transmission external device (external device) 300 via a communication network CN12. When the disk array subsystem 100 is employed in the local system 10, the host device 200 corresponds to the host computer 1, and the external device 300 corresponds to the relay system 20. Furthermore, when the disk array subsystem 100 is employed in the relay system 20, the host device 200 corresponds to the local system 10, and the external device 300 corresponds to the remote system 30. Further, when the disk array subsystem 100 is employed in the relay system 20, it is not necessary to provide a local storage device 150. This is because mapping a storage device contained in the external storage control device to an internal LU (or mapping to an intermediate storage hierarchy) located below the LU makes it possible to use it as an own storage device.

The disk array subsystem 100 can be generally divided into a control section and a storage section. The control section is composed, as will be described hereinbelow, of a channel adapter (abbreviated hereinbelow as CHA) 110, a cache package 120, and a disk adapter (abbreviated hereinbelow as DKA) 130. The storage section is composed of a storage device 150.

The disk array subsystem 100 can comprise a plurality of CHA110. Each CHA110 conducts data communication with the host device 200. Each CHA110 comprises ports (indicated as TP (target port) and IP (initiator port)) for conducting communication with external devices. Furthermore, each CHA110 comprises a plurality of processors 111 or local memories (not shown in the figures). A network address such as WWN (World Wide Name) or IP address is allocated to each CHA110. The command received via the target port is interpreted by the processor 111. The command is stored from the processor to the shared memory 121 via the command adapter (not shown in the figures). The data received from the host device 200 is stored in the cache memory 122 via the data adapter (not shown in the figures).

The disk array subsystem 100 can comprise a plurality of cache packages 120. Each cache package is configured, for example, as a printed board and comprises a shared memory 121 and a cache memory 122. Management information such as RAID group configuration information and control information such as commands are stored in the shared memory 121. Furthermore, tables T1 through T4 as described below can be also stored in the shared memory 121. Data received from the host device 200 and data read out from the storage device 150 are stored in the cache memory 122. Each CHA110 and each cache package 120 are connected via a switch 141. Thus, each CHA110 can access all the cache packages 120.

The disk array subsystem 100 can comprise a plurality of DKA130. Each DKA130 conducts data communication with the storage device 150. Each DKA130 is configured by providing respective processors or local memories (neither is shown in the figures) and connected to each storage device 150 via ports (not shown in the figures). Each DKA130 and cache packages 120 are connected via switches 141, and each DKA130 can access all the cache packages 120. Each DKA130 monitors as to whether a command from an external device has been received by periodically referring to the shared memory 121. For example, in the case of a read command, the DKA130 reads data by accessing the storage device 150 that stores the requested data. The DKA130 converts the physical address into a logical address (LBA: Logical Block Address) and stores the read-out data in the cache memory 122. In the case of a write command, the DKA130 acquires from the cache memory 122 the data that are requested to be written, conduct address conversion and the like, and writes the data to the designated address.

Each storage device 150 is connected to each DKA130 via a communication cable 142. One RAID group can be composed of a prescribed number (for example, four) of storage devices 150. At least one logical volume which is a logical storage area is formed in the physical storage area provided by each storage device 150 of each RAID group.

The external device 300 can have a configuration identical to that of the disk array subsystem 100 and comprises a storage device 350.

FIG. 3 is an explanatory drawing illustrating schematically the relation between the volumes. The real volume R is mapped to the second virtual volume V21, and the second virtual volume V21 is mapped to the second real volume R2. Mapping means that the address of a certain volume is allocated to the address of another volume. More specifically, mapping is possible, for example, by mapping the address of the second real volume R2, the address of the virtual volume V21, and the address of the real volume R. When the address of the second real volume R2 has been designated, if the address for this R2 is converted into the address for V21, and the address for V21 is converted into the address for R, the data stored in the real volume R can be read or the data can be written into the real volume R. More specifically, information other than the address information, for example, such as WWN, LU number, and-volume size is also catalogued in the mapping table for mapping the volumes. The "LU" shown in FIG. 3 is a volume provided with a LUN and is recognized from the external device (host computer or other storage control unit). Therefore, the IP21 of the relay system 20 can recognize the second real volume R2 and transmit a command. However, as described hereinabove, an independent entity such as the second real volume R2 is not actually present, and this entity is the first real volume R1.

The second real volume R2 is further mapped to the first virtual volume V12, and the first virtual volume V12 is mapped to the LU. As a result, the initiator port IP11 of the local system 10 can recognize the first virtual volume V12 and can transmit a command. In FIG. 3, the virtual volume V21 is mapped to one real volume R, but such a mapping is not limiting and, for example, one virtual volume V21 may be formed from a plurality of real volumes.

FIG. 4 is an explanatory drawing illustrating the schematic configuration of the mapping table for mapping the volumes of two types. FIG. 4 and FIG. 5 show generalized configurations of the tables and therefore those configurations do not necessarily correspond to the configurations shown in FIG. 1 and FIG. 3. FIG. 4(a) shows a virtual volume—real volume mapping table (referred to hereinbelow as a V/R table) T1 for mapping the virtual volumes and real volumes, and FIG. 4(b) shows a LU—virtual volume mapping table (referred to hereinbelow as a LU/V table) T2 for mapping the LU and the virtual volumes.

First, the V/R table T1 will be explained. The V/R table T1, as shown in FIG. 4(a), maps to each other the start address of the allocated real volumes, the size of virtual volumes, and the multiple virtualization decision information for each virtual volume number (#V). The multiple virtualization decision information is the information for deciding as to whether a plurality of virtual volumes have been allocated to one real volume. FIG. 4(a) shows a configuration in which a plurality of virtual volumes can be mapped to one real volume. When a virtual volume is mapped to a plurality of real volumes, managing may be conducted by also including the real volume number. Referring to the V/R table T1 makes it possible to decide to which range in the real volume a certain virtual volume is allocated.

The LU/V table T2, as shown in FIG. 4(b), maps to each other the number of the allocated virtual volume, the start address in the virtual volume, and the size of virtual volumes for each LU number (#LU). FIG. 4(b) shows a configuration in which a plurality of LU can be set for a plurality of virtual volumes. Referring to the LU/V table T2 makes it possible to decide to which LU is allocated to which range of all the virtual volumes.

FIG. 5(a) is a volume number conversion table T3 for the LU number and virtual volume number. The volume number conversion table maps and manages the LU number and virtual volume number. The conversion table T3 corresponds to the LU/V table T2 and will be referred to in the below-described processing operation of the present embodiment.

FIG. 5(b) is an address conversion table T4 for conducting address conversion of virtual volumes and real volumes. The address conversion table T4 maps and manages the WWN and LU number of corresponding real volumes (path information), start address (start LBA: Logic Block Address) and final address (MaxLBA), and volume attribute. This address conversion table T4 corresponds to the V/R table T1 and will be referred to in the below-described processing operation of the present embodiment. The above-described tables T1 through T4 can be stored in the shared memory 121.

Figure 6:
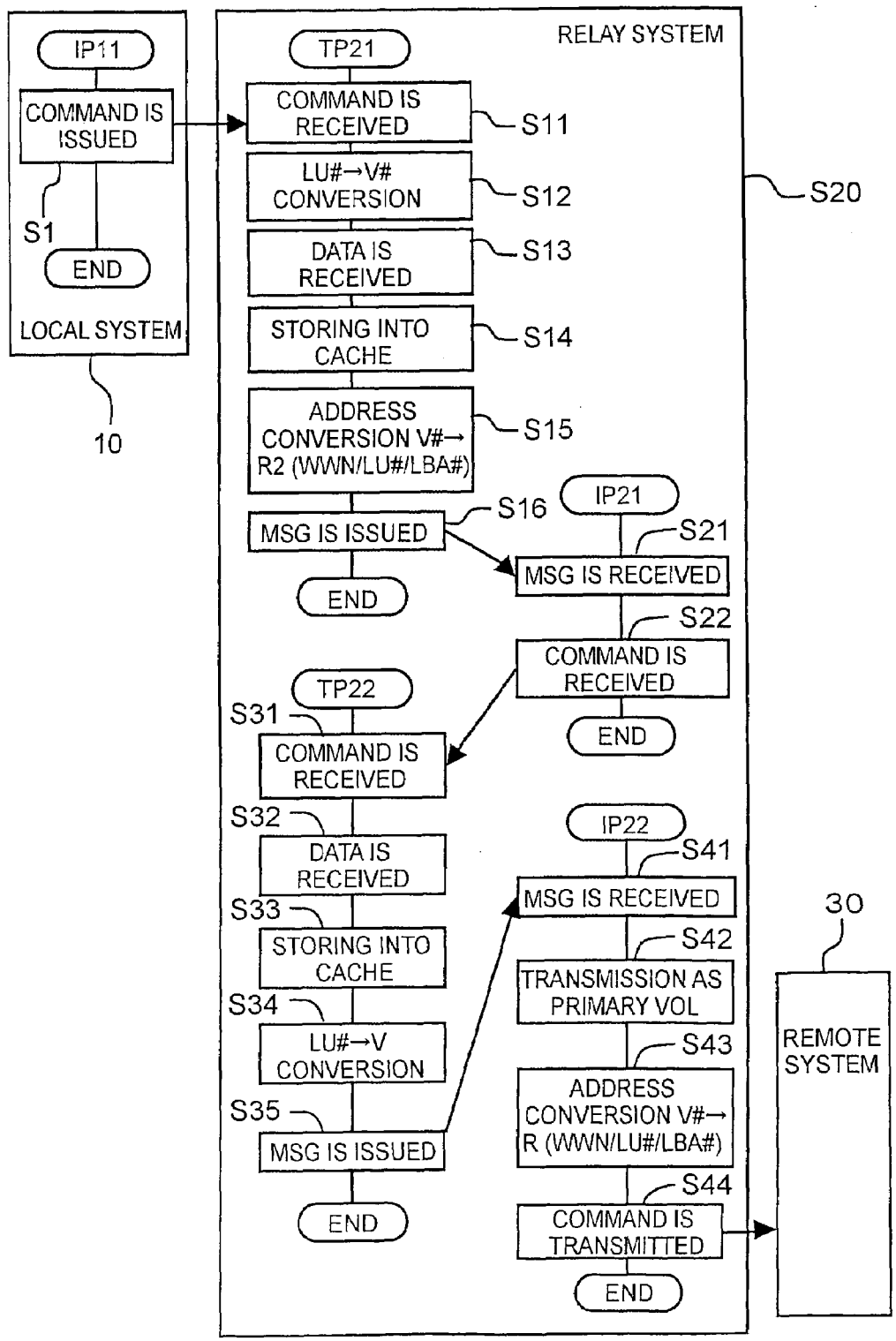
FIG. 6 is a flow chart illustrating the outline of the entire operation of the storage system.

FIG. 6 is a flow chart illustrating the outline of the entire operation of the storage system. In this flow chart, a mode is shown in which when data update is conducted from the host computer 1 to the copy source volume V11 of the local system 10, this data update is reflected in the remove system 30 via the relay system 20.

The storage system reflects the data update from the host computer 1 in the local system 10, relay system 20, and remote system 30. Thus, in the storage system, copies of the copy source volume V11 used by the host computer 1 are generated in both the relay system 20 and the remote system 30.

The flow chart shown in FIG. 6 is mainly executed by the CHA110 of each system. More specifically, it is executed by the CHA110 having an initiator port (IP) or target port (TP) relating to this processing. Partial processing is executed by the DKA130 of each system.

First, all the storage contents of the copy source volume V11 of the local system 10 are copied into both the real volume R of the relay system 20 and the copy destination volume V22 of the remote system 30. This copying is called the initial copying. The initial copying synchronizes the contents of the volume systems V11, R, V22.

If the host computer 1 conducts data update (issues a write command) with respect to the copy source volume V11 in this state, the information contents of the copy source volume V11 is updated in response to this command. Therefore, a difference occurs with the storage contents after the initial copying. Referring to an example of the local system 10 having the configuration shown in FIG. 2, when a write command has been issued by the host computer 1, the CHA110 stores the update data in the cache memory 122 and stores the record that the write command has been received in the shared memory 121. If the DKA130 detects the presence of the write command by referring to the shared memory 121, it reads the update data stored in the cache memory 122 and stores it in a prescribed storage area of the storage device 150.

The local system 10 transmits the write command from the initiator port IP 11 to the relay system 20 via the communication network CN2 in parallel with the update of the copy source volume V11 or after the update of the copy source volume V11 has been completed (S1). This write command is composed of the update data which is to be stored and the information designating the storage address, for example, as [WWN#/LU#/LBA# . . . ].

The relay system 20 received the write command from the local system 10 via the target port TP21 (S11). The TP21 converts the LU number (LU#) present in the write command into the virtual volume number (V#) by referring to the volume number conversion table T3 (S12). Then, the TP21 conduct data reception processing as the first virtual volume V12 (S13) and stores the received data in the first cache memory C12 (S14). The TP21 conducts address conversion of the data stored in the cache memory C12 by referring to the address conversion table T4 (S15). The address of update data is thus converted to the address corresponding to the second real volume R2. After the address conversion, the TP21 issues a message (MSG) to the IP21.

This message is an internal indication for writing data into the second real volume R2. However, as described hereinabove, because the second real volume R2 is a virtual eneity, data are not actually written into the second real volume R2. The IP21 that has received the message issues a write command to the TP22 (S22). Thus, The write request from the first virtual volume V12 to the second real volume R2 is converted into the write request into the second virtual volume V21. Data inputted into the first virtual volume V12 is transferred into the second virtual volume V21 via the communication network CN3.

If the TP22 receives the write command from the IP21 (S31), it conducts data reception processing as the second virtual volume V21 (S32) and writes the received data into the second cache memory C21 (S33). The TP22 converts the LU numbers to the virtual volume numbers (V21 numbers) (S34) by referring to the volume number conversion table T3 and issues a message to the IP22 (S35).

If the IP22 receives the message from the TP22 (S41), it conducts transmission processing as the main volume (V21) of the copy destination volume V22 (S42). The IP22 converts the address setting the virtual volume V21 as the object into the address for the copy destination volume V22 by referring to the address conversion table T4 (S43). Then, the IP22 transmits a write command to the remote station 30 via the communication network CN4 (S44).

If the TP31 of the remote system 30 receives the write command from the relay system 20, it writes the received data into the copy destination volume V22 (this is not shown in the figures). Further, the IP22 of the relay system 20 transmits a write command to the real volume R of the other storage control unit 40 via the communication network CN5 (this is not shown in the figures). If the other storage control unit 40 receives the write command from the relay system 20, it writes the received data in the real volume R1.

Here, data writing from the local system 10 to the relay system 20 is conducted in a synchronous mode. Thus, if a write command is transmitted from the local system 10 to the relay system 20, the relay system 20 stores the received data in the cache memory C12 and returns a write completion report to the local system 10. If the local system 10 receives the write completion report from the relay system 20, it reports the write completion to the host computer 1.

On the other hand, data writing from the relay system 20 into the remote system 30 and data writing from the relay system 20 to the real volume R1 are conducted in asynchronous modes. That is, writing is completed once the data has been stored in the second cache memory C21 (cache memory for transmission) of the relay system 20, and then data transmission to the copy destination volume V22 is conducted.

In the present embodiment, as an example, a comparatively short distance was set between the local system 10 and the relay system 20, and a comparatively large distance was set between the relay system 20 and the remote system 30. Therefore, the synchronous mode was used for data transfer between the local system 10 and the relay system 20, and the asynchronous mode was used for data transfer between the relay system 20 and the remote system 30.

In the present embodiment, as described hereinabove, a plurality of virtual volumes V12, V21 are mapped to one real volume R1, one virtual volume V12 is used for data reception, and the other virtual volume V21 is used for data transmission. Therefore, the size of real volume can be decreased by half and the cost can be reduced by comparison with the case in which individual real volumes are prepared for each of respective virtual volumes V12, V21. Thus, multiple control can be executed at a low cost because a plurality of virtual volumes V12, V21 with different control objects can be allocated to one real volume R1. The virtual volume other than the virtual volume for executing the relay function of remote copying can be also mapped to the shared real volume and the control function for other services can be allocated to this virtual volume.

Further, the reliability of the storage system can be increased because a copy of the copy source volume V11 can be placed in both the relay system 20 and the remote system 30.

Furthermore, because the real volume R1 of the other storage control unit 40 is used by allocating to each virtual volume V12, V21 of the relay system 20, the already present volume R1 can be used as if it is an internal volume of the relay system 20. Therefore, the relay system 20 can be configured by reusing the already present volume R1 and the conventional storage resources can be used effectively. For example, when the relay system 20 is a high-capacity system, for example, such that has a large loading amount of the cache memory and a high data processing capacity, even when the other storage control unit 40 has a low capacity, this low capacity of the other storage control unit 40 can be concealed and the real volume R1 can be used. Further, the effect of the above-described embodiments places no limitation on the scope of the present invention; the same is true for the below-described other embodiments.

Second Embodiment

The second embodiment will be explained with reference to FIG. 7 and FIG. 8. This embodiment is equivalent to a modification example of the first embodiment. A specific feature of this embodiment is that data transfer from the first virtual volume V12 to the second virtual volume V21 is realized by interchache copying.

Figure 7:
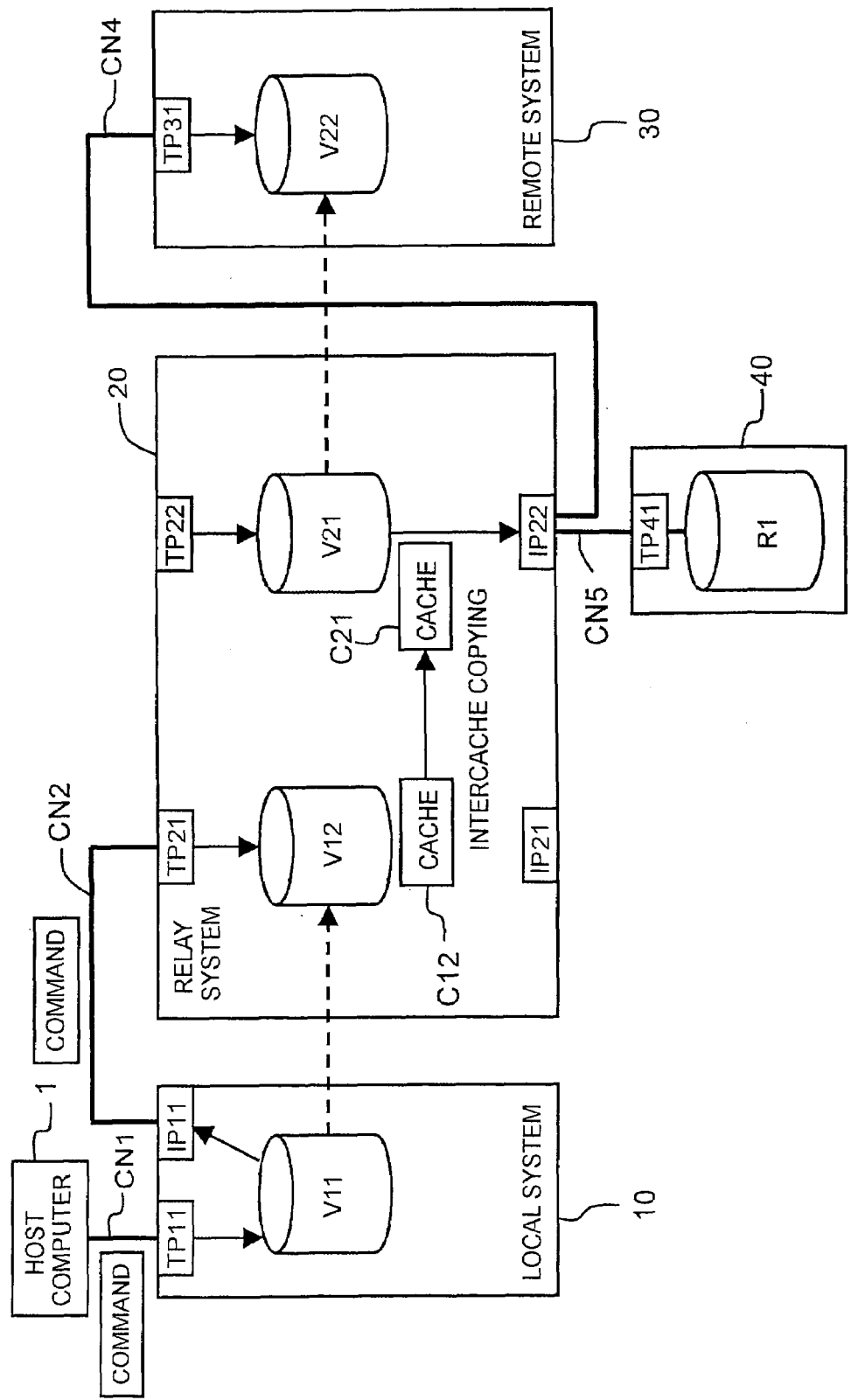
FIG. 7 is a block diagram illustrating the outline of the entire storage system of a second embodiment of the present invention.

FIG. 7 is a block diagram illustrating the outline of the storage system of the present embodiment. In the present embodiment, the communication network CN3 for connecting the IP21 and TP22 is not provided. A link between the virtual volumes V12, V21 is realized by communication using a shared memory or local memory. Thus, communication between the volumes V12, V21 is conducted via the shared memory 121 shown in FIG. 2 or a local memory present in each CHA110. Therefore, in the present embodiment, a cable for connecting the IP21 and TP22 becomes unnecessary and the mechanical structure can be simplified.

Figure 8:
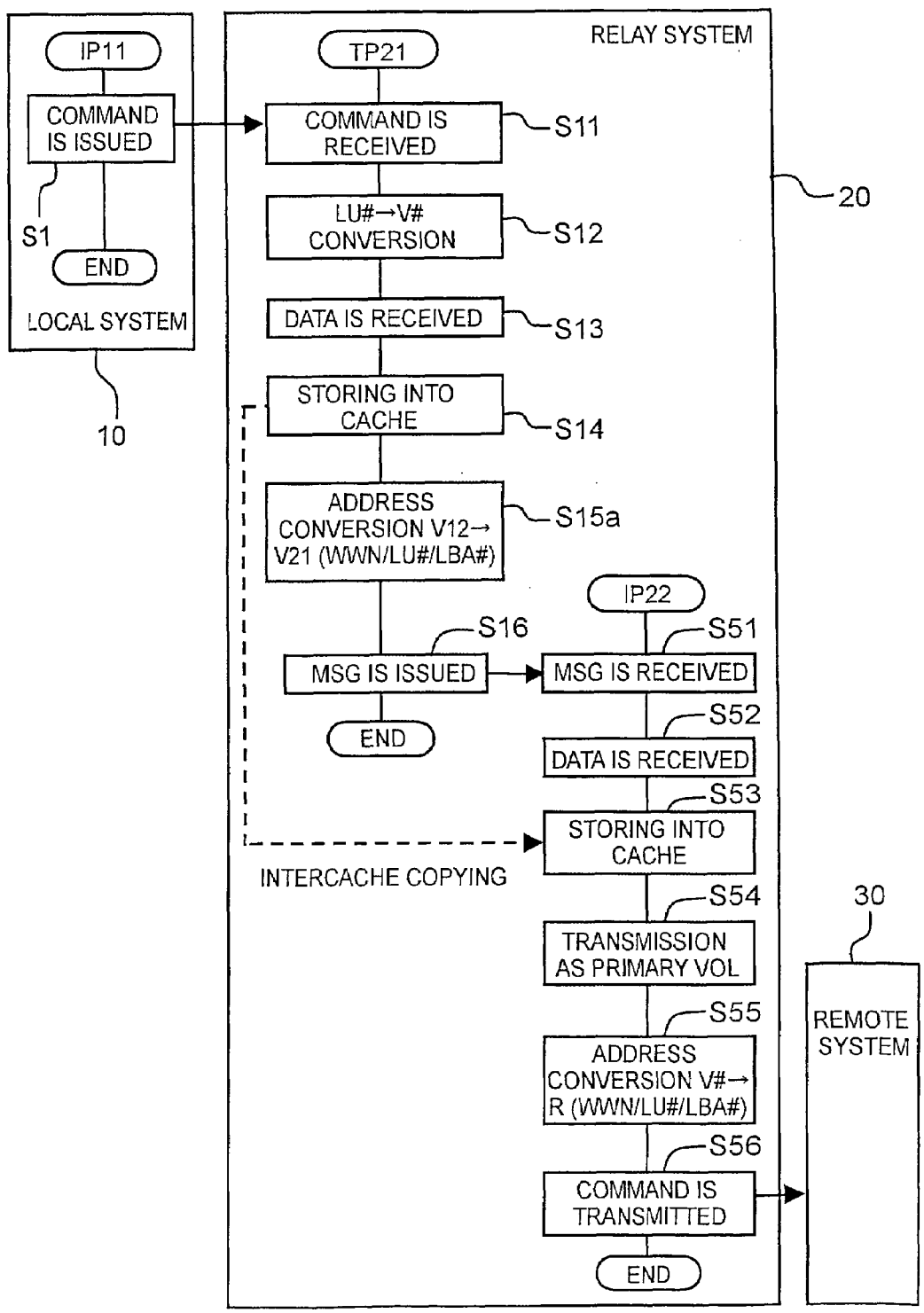
FIG. 8 is a flow chart illustrating the outline of the entire operation of the storage system.

FIG. 8 is a flow chart illustrating the outline of the entire operation of the present embodiment. Because the operation of the present embodiment is mostly identical to that described in the first embodiment, the explanation will be focused on the configuration which is specific to the present embodiment to avoid redundant explanation.

If the TP 21 of the relay system 20 receives a write command from the local system 10 (S11), the conversion of volume number is conducted (S12, S13) and the received data is stored in the first cache memory C12 (S14). The data stored in the first cache memory C12 is copied into the second cache memory C21. Further, the TP21 converts the address designated by the write command into the address for the second virtual volume V21 (S15a) by referring to the address conversion table T4 and issues a message to the IP 22 (S16). This message is posted via the shared memory or local memory.

If the IP 22 receives the message from the TP21 (S51), it starts the data reception processing as the second virtual volume V21 (S52). However, as described hereinabove, the reception data stored in the first cache memory C12 has already been copied into the second cache memory C21 by intercache copying. Therefore, in the present embodiment, the processing of steps S52, S53 is a formal processing. Then, similarly to the first embodiment, the reception data copied into the second cache memory C21 is transferred from the IP22 to the copy destination volume V22 via the communication network CN4 (S56). Further, the reception data copied into the second cache memory C21 is transferred to the real volume R via the communication network CN5.

Third Embodiment

The third embodiment will be explained hereinbelow based on FIG. 9 and FIG. 10. This embodiment corresponds to the second modification example of the first embodiment. A specific feature of the present embodiment, as compared to the second embodiment. is that a single cache memory C21 can be shared for use between a plurality of virtual volumes V12, V21.

Figure 9:
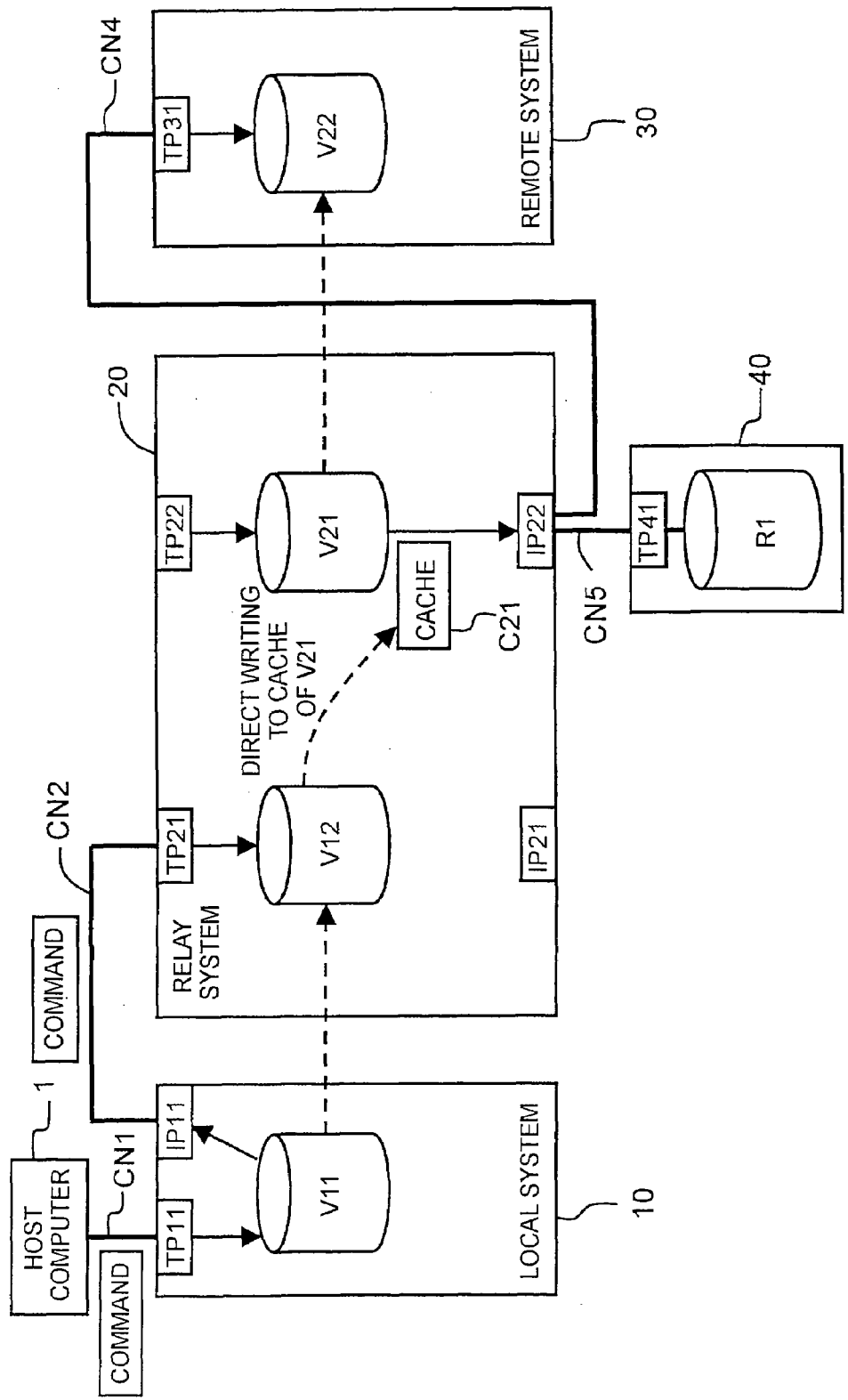
FIG. 9 is a block diagram illustrating the outline of the entire storage system of a third embodiment of the present invention.

FIG. 9 is a block diagram illustrating the outline of the storage system of the present embodiment. In this embodiment, too, similarly to the second embodiment, the communication network CN3 connecting the IP21 and TP22 is not provided. A link between the virtual volumes V12, V21 is realized by communication using a shared memory or local memory. Furthermore, in the present embodiment, only the cache memory C21 is provided. Therefore, in the present embodiment, a cable connecting the IP21 and TP22 is not required and half of the cache memory will suffice. Therefore, the mechanical structure can be further simplified.

Figure 10:
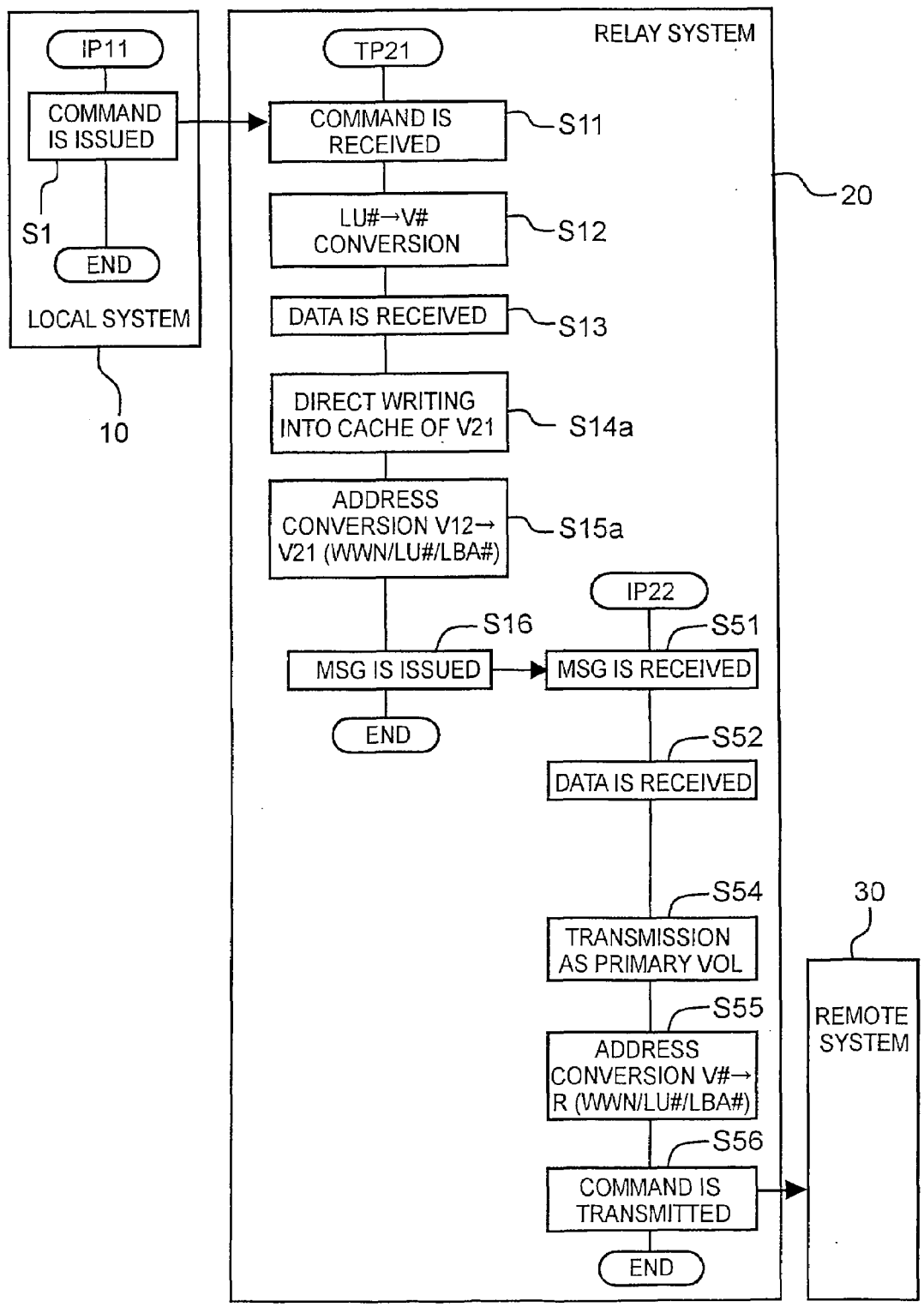
FIG. 10 is a flow chart illustrating the outline of the entire operation of the storage system.

FIG. 10 is a flow chart illustrating the outline of the entire operation of the present embodiment. Because the operation of the present embodiment, similarly to that of the second embodiment, is mostly identical to that described in the first embodiment, the explanation will be focused on the configuration which is specific to the present embodiment to avoid redundant explanation.

If the TP21 present in the relay system 20 receives a write command from the local system 10 (S11), the conversion of volume number is conducted (S12, S13). The TP21 directly writes the data received from the local system 10 to the cache memory C21 (S14a). Then, the TP21 converts the address designated by the write command to the address for the second virtual volume V21 (S15a), and issues a message to the IP22 (S16). The message posting is conducted via the shared memory or local memory.

If the IP22 receives the message from the TP21 (S51), it starts the data reception processing as a second virtual volume V21 (S52). As described hereinabove, the data received by the first virtual volume V12 has already been stored in the cache memory C21. Accordingly, the IP22 doest not conduct data storing into the cache memory C21 (in the present embodiment, S53 is unnecessary and therefore omitted) and stars transmission processing as primary volume (S54–S56).

Fourth Embodiment

Figure 11:
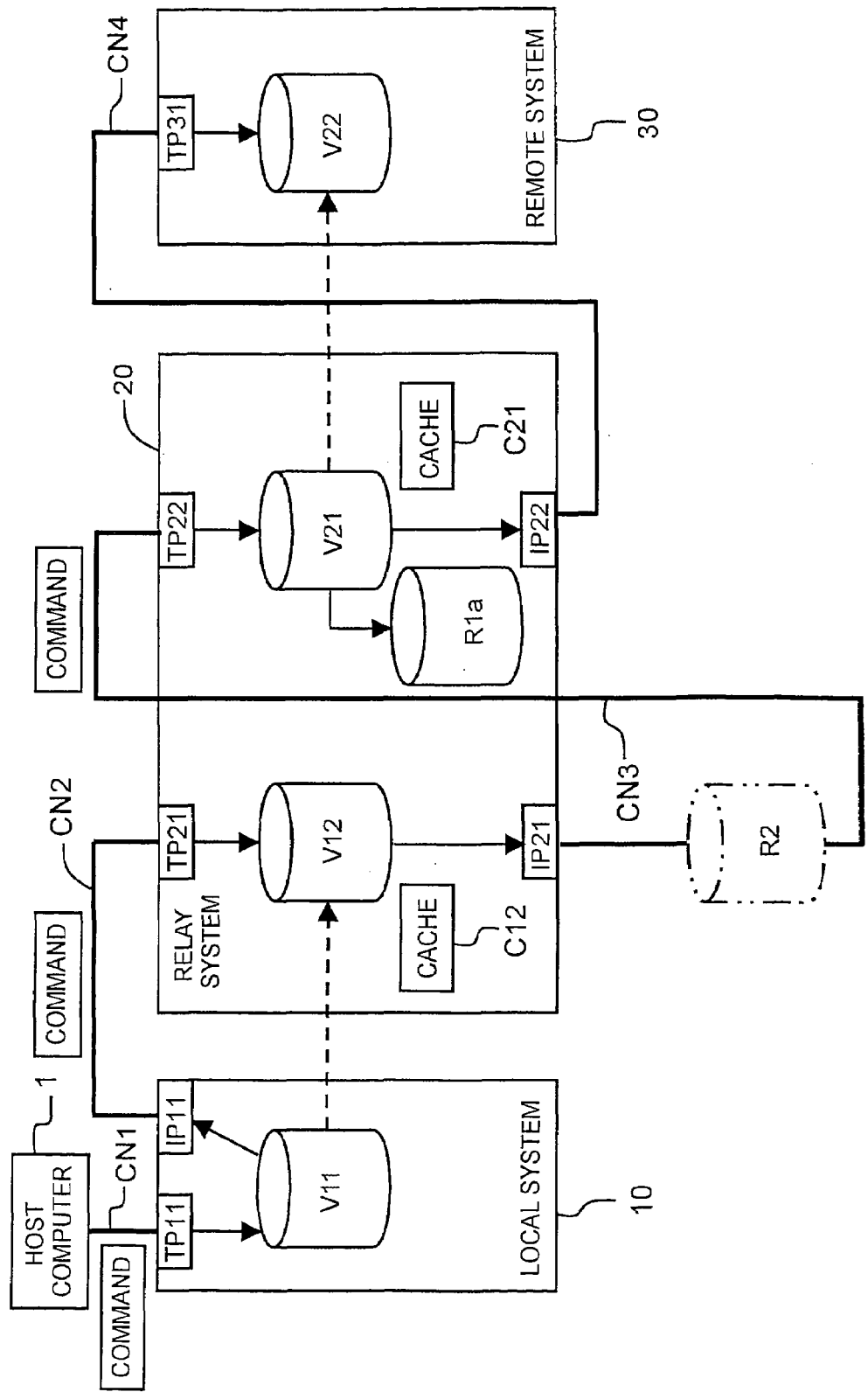
FIG. 11 is a block diagram illustrating the outline of the entire storage system of a fourth embodiment of the present invention.

The fourth embodiment will be explained based on FIG. 11. This embodiment corresponds to the third modification example of the first embodiment. FIG. 11 is a block diagram illustrating the outline of the entire storage system. A specific feature of the present embodiment, as compared to the second embodiment, is that a plurality of virtual volumes V12, V21 with different control contents are allocated to an internal real volume R1a.

Fifth Embodiment

Figure 12:
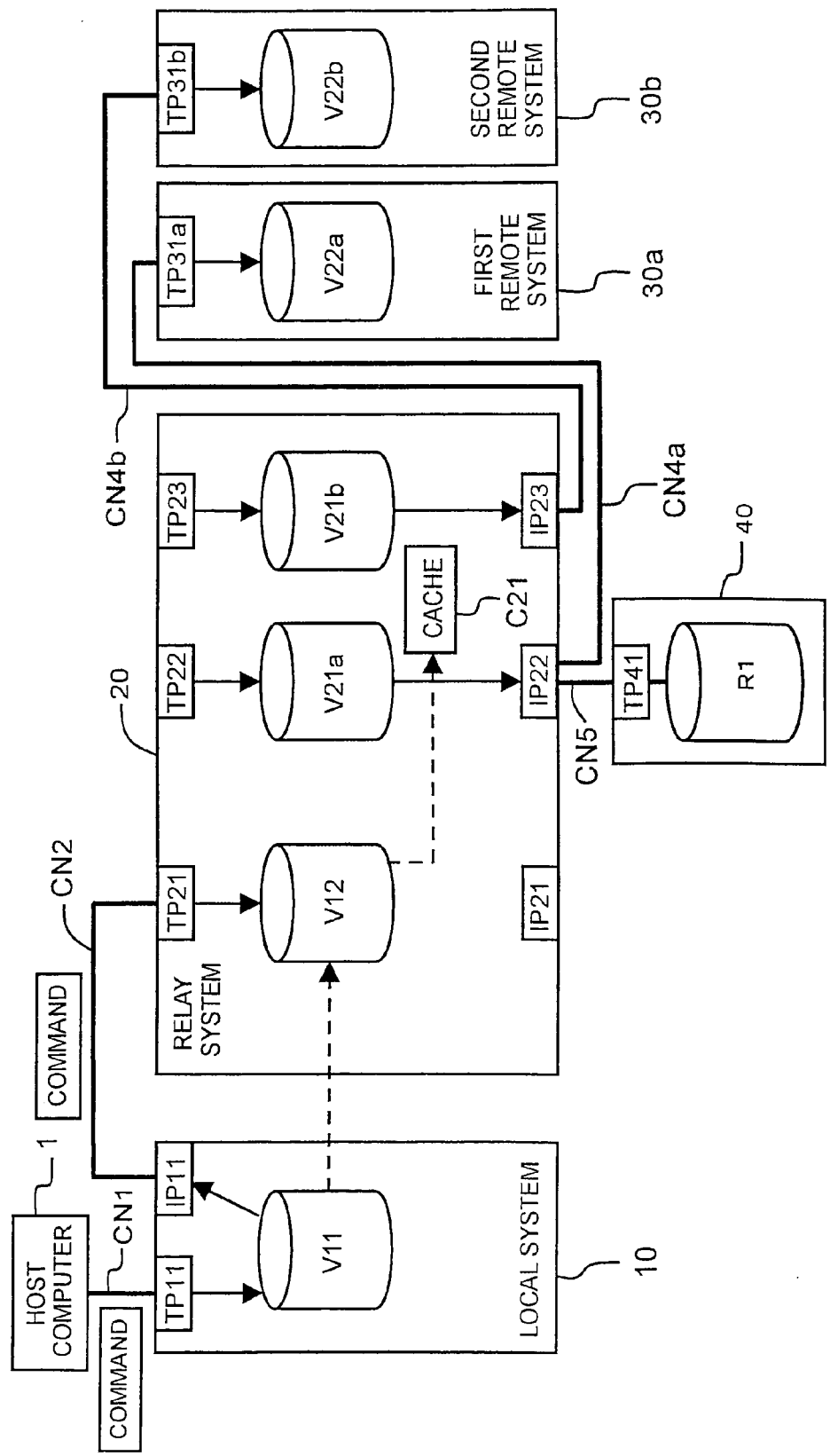
FIG. 12 is a block diagram illustrating the outline of the entire storage system of a fifth embodiment of the present invention.

FIG. 12 is a block diagram illustrating the outline of the entire storage system of fifth embodiment. This embodiment corresponds to the fourth modification example of the first embodiment. A specific feature of the present embodiment is that a plurality of virtual volumes for transmission are provided and data are transmitted to respective different remote sites. The case is considered in which the present embodiment is applied to the configuration of the second modification example (third embodiment), but similar applications are also possible to other above-described embodiments.

In the relay system 20 of the present embodiment, one first virtual volume V12 for reception control and two second virtual volumes V21a, V21b for transmission control are provided. Each of the second virtual volumes V21a, V21b is mapped to respective identical real volume R1. Therefore, in the present embodiment, three virtual volumes V12, V21a, V21b are allocated to one real volume R1. Further, the connection from the first virtual volume V12 to each second virtual volume V21a, V21b is conducted by communication via a shared memory or local memory.

If the first virtual volume V12 receives a write command from the local system 10, the reception data is written into the shared cache memory C21. This cache memory C21 is referred to by each of the second virtual volumes V21a, V21b.

One second virtual volume V21a is connected to a copy destination volume V22a of a first remote system 30a from the IP22 via a communication network CN4a. This, virtual volume V21a forms a pair with the copy destination volume V22a and becomes a primary volume corresponding to the copy destination volume V22a. Similarly, the other second virtual volume V21b is connected to a copy destination volume V22b of the second remote system 30b from the IP23 via a communication network CN4b. The virtual volume V21b is used as a primary volume of the copy destination volume V22b.

The data received from the local system 10 is written into the shared cache memory C21. Each of the second virtual volumes V21a, V21b asynchronously transfers the data to the copy destination volumes V22a, V22b forming respective pairs. Furthermore, any one of the second virtual volumes V21a, V21b asynchronously transfers the data to the real volume R1.

With the present embodiment, copies of the copy source volume V11 can be placed into a plurality of remote systems 30a, 30b and reliability can be further increased. Furthermore, because three virtual volumes V12, V21a, V21b are allocated to one real volume R1, remote copying to multiple locations can be implemented at a lower cost.

Sixth Embodiment

Figure 13:
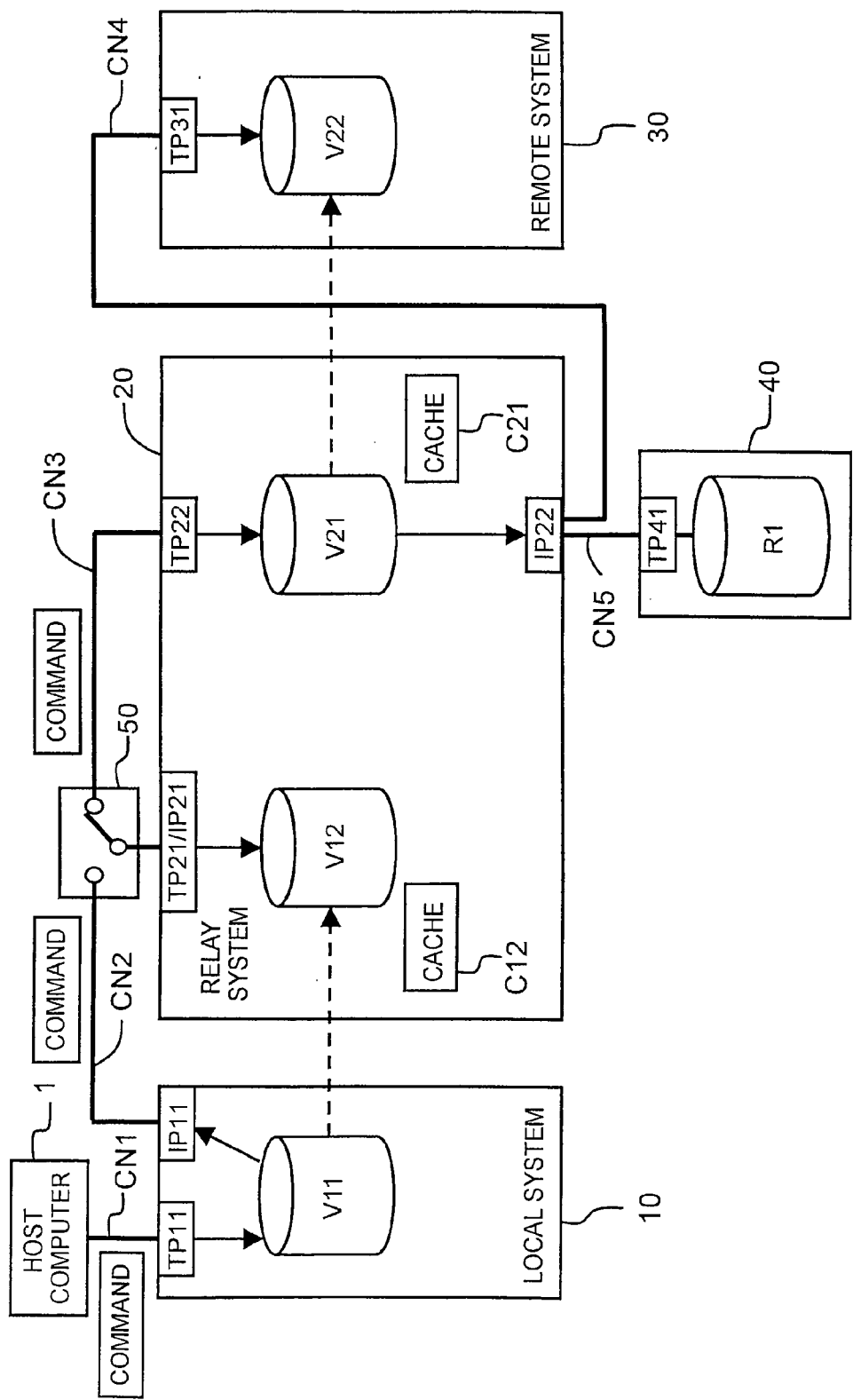
FIG. 13 is a block diagram illustrating the outline of the entire storage system of a sixth embodiment of the present invention.

FIG. 13 is a block diagram illustrating the outline of the entire storage system of the sixth embodiment. This embodiment corresponds to the fifth modification example of the first embodiment. A specific feature of the present embodiment is that the same port can be used as the target port TP21 at one time and as the initiator port IP21 at another time.

Data copying from the copy source volume V11 of the local system 10 to the first virtual volume V12 and data copying from the first virtual volume V12 to the second virtual volume V21 are conducted in respective different intervals, that is, exclusively. Therefore, the same port functions as the initiator port TP21 during data copying from the copy source volume V11 to the first virtual volume V12 and functions as the initiator port IP21 during data copying from the first virtual volume V12 to the second virtual volume V21.

This port TP21/IP21 is connected via a change-over switch to the local system 10 and remote system 30, respectively. When a write command is received from the local system 10, the port TP21/IP21 is connected via the switch 50 to the local system 10. When a write command is transmitted to the remote system 30, the port TP21/IP21 is connected via the switch 50 to the remote system 30.

Further, this signal port TP21/IP21 can be divided into the TP21 and IP21 to obtain a configuration in which each port can operate as a single port. In this case, the changeover switch 50 becomes unnecessary.

Seventh Embodiment

Figure 14:
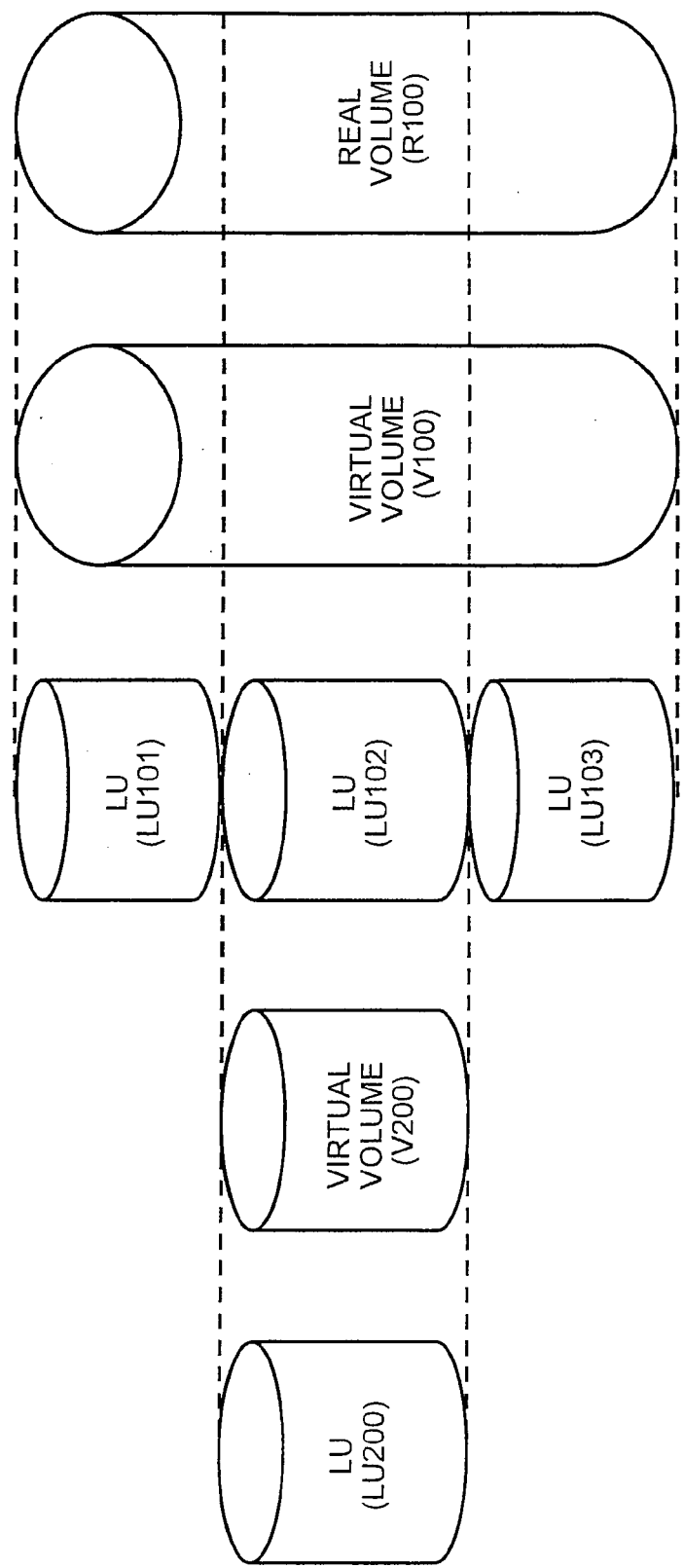
FIG. 14 is an explanatory drawing illustrating schematically the storage structure of a seventh embodiment of the present invention.

The seventh embodiment will be explained based on FIG. 14. This embodiment corresponds to the sixth modification example of the first embodiment. In this embodiment, a lower-order virtual volume V100 is allocated to the real volume R100. Further, multiple LU101–103 are allocated to the lower-order virtual volume V100. Furthermore, among the LU101–103, the upper virtual volume V200 is allocated to one LU102, and the LU200 is allocated to this upper-order virtual volume V200.

Comparison with the configuration of the first embodiment, shows that the real volume R100 corresponds to the real volume R1, the lower-order virtual volume V100 corresponds to the second virtual volume V21, and the upper-order virtual volume V200 corresponds to the first virtual volume V12. Therefore, the relay system 20 uses a storage structure composed of the LU200, V200, LU102, part of V100, and part of R100.

Other LU101, 103 can be used for the same or different respective services. For example, the LU101 and LU103 can be connected to respective other host computers, and the remote copying of the copy source volume V11 can be used as a different service (customer management, mail server, and the like).

Eighth Embodiment

Figure 15:
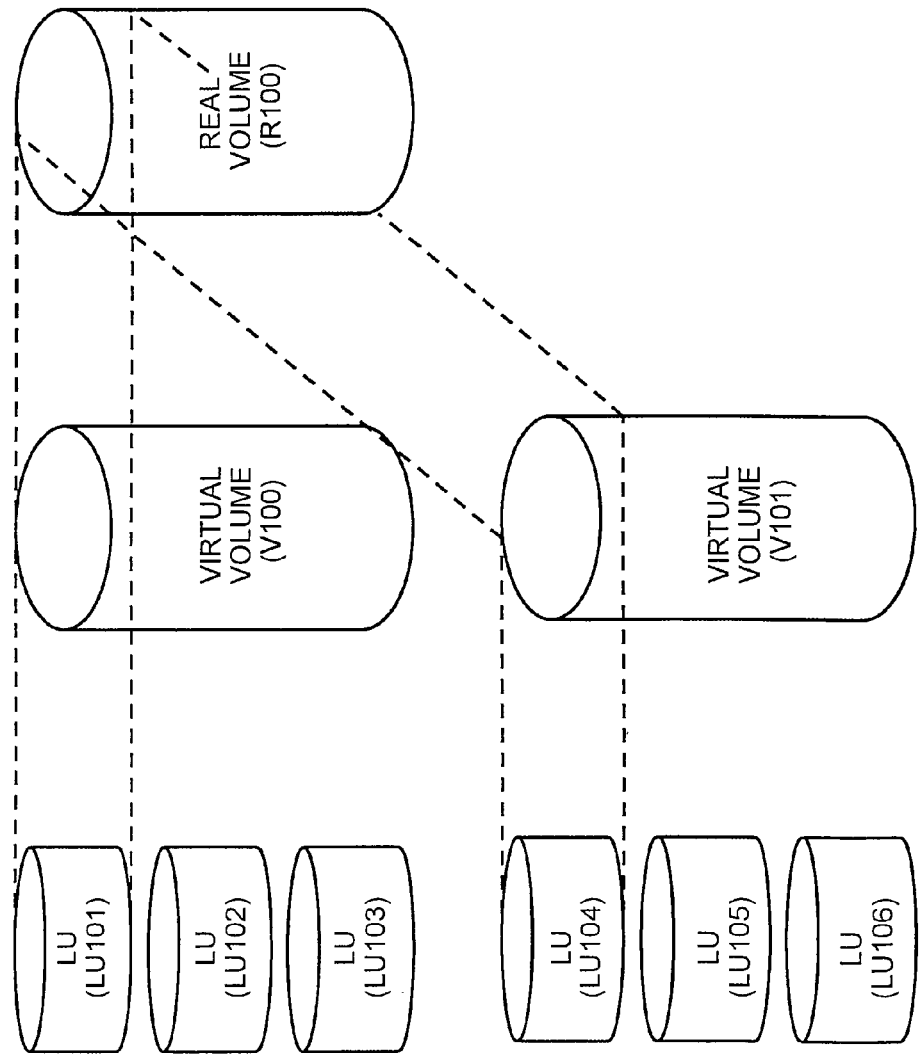
FIG. 15 is an explanatory drawing illustrating schematically the storage structure of an eighth embodiment of the present invention.

The eighth embodiment will be explained based on FIG. 15. This embodiment corresponds to the seventh modification example of the first embodiment. This embodiment can be advantageously used in the second embodiment (or third embodiment).

The respective different virtual volumes V100, V101 are mapped in a parallel relationship to a single real volume R100. Further, a plurality of respective LU are set for the virtual volumes V100, V101. A total of three LU, namely, LU101–103, are set in a parallel relationship for one virtual volume V100, and the three LU, namely, LU104–106, are set in a parallel relationship for the other virtual volume V101. Here, the corresponding LU of the two groups are allocated to the same storage area. That is, LU101 and LU104, LU102 and LU105, and LU103 and LU106 form respective pairs and share part of the storage area of the real volume R100.

Comparison with the configuration of the second embodiment shows that the real volume R100 corresponds to the real volume R1, for example, the LU101 corresponds to the LU of the first virtual volume V1, and the LU104 corresponds to the LU of the second virtual volume V21. Further, a pair of different LU (LU102 and LU105, and the like) may be also used. Pairs of remaining LU can be used for respective separate applications (services).

Ninth Embodiment

Figure 16:
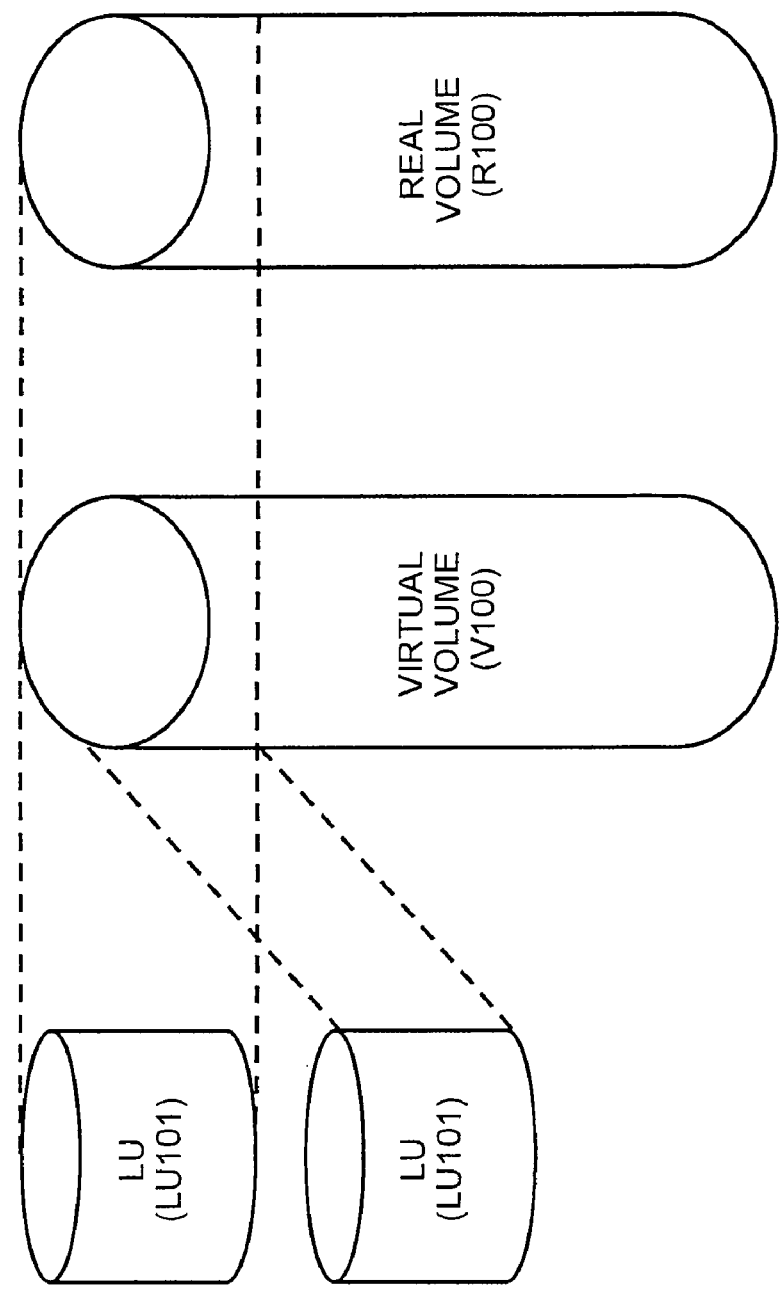
FIG. 16 is an explanatory drawing illustrating schematically the storage structure of a ninth embodiment of the present invention.

The ninth embodiment will be explained based on FIG. 16. This embodiment corresponds to the eighth modification example of the first embodiment. This embodiment can be especially advantageously used in the third embodiment.

A virtual volume V100 is allocated to the real volume R100, and each of the two LU101, 102 is allocated to part of the virtual volume V100. Comparison with the third embodiment shows that the real volume R100 corresponds to the real volume R1, the LU101 corresponds to the LU of the first virtual volume V12, and the LU102 corresponds to he LU of the second virtual volume V21.

Furthermore, a portion of the virtual volume V100, which is shared by the LU101, 102 can be also considered as a shared cache memory C21. Thus, it can be assumed that LU101, 102 are created in the storage space of the cache memory C21.

Further, the present invention is not limited to the above-described embodiments. Various modifications and changes that will be apparent to those skilled in the art may be resorted to, without departing from the scope of the invention. For example, remote copying of the local system 10 and relay system 20 may be also conducted in an asynchronous mode. Further, the present invention is not limited to the application to the so-called open system, and the application to a mainframe is also possible.

FIG. 1
1 HOST COMPUTER
COMMAND
COMMAND
10 LOCAL SYSTEM
20 RELAY SYSTEM
C12 CACHE MEMORY
COMMAND
C21 CACHE MEMORY
30 REMOTE SYSTEM

FIG. 2
200 RECEPTION EXTERNAL DEVICE
300 TRANSMISSION EXTERNAL DEVICE
120 CACHE PACKAGE
121 SHARED MEMORY
MANAGEMENT INFORMATION
122 CACHE MEMORY

FIG. 3
VIRTUAL VOLUME (V12)
VIRTUAL VOLUME (V21)
REAL VOLUME (R)

FIG. 4

(a) VIRTUAL VOLUME - REAL VOLUME MAPPING TABLE

| VIRTUAL VOLUME NUMBER #V | 0 | REAL VOLUME ADDRESS VIRTUAL VOLUME ADDRESS MULTIPLE VIRTUALIZATION DECISION INFORMATION |
|---|---|---|
| | 1 | REAL VOLUME ADDRESS VIRTUAL VOLUME ADDRESS MULTIPLE VIRTUALIZATION DECISION INFORMATION |
| | 2 | REAL VOLUME ADDRESS VIRTUAL VOLUME ADDRESS MULTIPLE VIRTUALIZATION DECISION INFORMATION |
| | . | . |

(b) LU - VIRTUAL VOLUME MAPPING TABLE

| LU NUMBER #V | 0 | VIRTUAL VOLUME NUMBER START ADDRESS IN VIRTUAL VOLUME LU SIZE |
|---|---|---|
| | 1 | VIRTUAL VOLUME NUMBER START ADDRESS IN VIRTUAL VOLUME LU SIZE |
| | 2 | VIRTUAL VOLUME NUMBER START ADDRESS IN VIRTUAL VOLUME LU SIZE |
| | . | . |

FIG. 5

(a) LU#-V# CONVERSION TABLE

| LU# | V# |
|---|---|
| 0 | 0 |
| 1 | 1 |
| 2 | 2 |
| . | . |

(b) ADDRESS CONVERSION TABLE

| VIRTUAL VOLUME NUMBER #V | 0 | WWN#/LU# START LBA/MaxLBA VOLUME ATTRIBUTE |
|---|---|---|
| | 1 | WWN#/LU# START LBA/MaxLBA VOLUME ATTRIBUTE |
| | 2 | WWN#/LU# START LBA/MaxLBA VOLUME ATTRIBUTE |
| | 3 | WWN#/LU# START LBA/MaxLBA VOLUME ATTRIBUTE |
| | . | . |

FIG. 6
S1 COMMAND IS ISSUED
10 LOCAL SYSTEM
S11 COMMAND IS RECEIVED
S12 LU#→V# CONVERSION
S13 DATA IS RECEIVED
S14 STORING INTO CACHE
S15 ADDRESS CONVERSION V#→R2 (WWN/LU#/LBA#)
S16 MSG IS ISSUED
S21 MSG IS RECEIVED
S22 COMMAND IS RECEIVED
S31 COMMAND IS RECEIVED
S32 DATA IS RECEIVED
S33 STORING INTO CACHE
S34 LU#→V CONVERSION
S35 MSG IS ISSUED
S41 MSG IS RECEIVED
S42 TRANSMISSION AS PRIMARY VOL
S43 ADDRESS CONVERSION V#→R (WWN/LU#/LBA#)
S44 COMMAND IS TRANSMITTED
20 RELAY SYSTEM
30 REMOTE SYSTEM

FIG. 7
1 HOST COMPUTER
COMMAND
COMMAND
10 LOCAL SYSTEM
20 RELAY SYSTEM

30 REMOTE SYSTEM
C12 CACHE
C21 CACHE
INTERCACHE COPYING

FIG. 8
S1 COMMAND IS ISSUED
10 LOCAL SYSTEM
S11 COMMAND IS RECEIVED
S12 LU#→V# CONVERSION
S13 DATA IS RECEIVED
S14 STORING INTO CACHE
S15a ADDRESS CONVERSION V12→V21 (WWN/LU#/LBA#)
S16 MSG IS ISSUED
S51 MSG IS RECEIVED
S52 DATA IS RECEIVED
S53 STORING INTO CACHE
INTERCACHE COPYING
S54 TRANSMISSION AS PRIMARY VOL
S55 ADDRESS CONVERSION V#→R (WWN/LU#/LBA#)
S56 COMMAND IS TRANSMITTED
20 RELAY SYSTEM
30 REMOTE SYSTEM

FIG. 9
1 HOST COMPUTER
COMMAND
COMMAND
10 LOCAL SYSTEM
20 RELAY SYSTEM
30 REMOTE SYSTEM
C21 CACHE
DIRECT WRITING TO CACHE OF V21

FIG. 10
S1 COMMAND IS ISSUED
10 LOCAL SYSTEM
S11 COMMAND IS RECEIVED
S12 LU#→V# CONVERSION
S13 DATA IS RECEIVED
S14a DIRECT WRITING INTO CACHE OF V21
S15a ADDRESS CONVERSION V12→V21 (WWN/LU#/LBA#)
S16 MSG IS ISSUED
S51 MSG IS RECEIVED
S52 DATA IS RECEIVED
S54 TRANSMISSION AS PRIMARY VOL
S55 ADDRESS CONVERSION V#→R (WWN/LU#/LBA#)
S56 COMMAND IS TRANSMITTED
20 RELAY SYSTEM
30 REMOTE SYSTEM

FIG. 11
1 HOST COMPUTER
COMMAND
COMMAND
COMMAND
10 LOCAL SYSTEM
20 RELAY SYSTEM
30 REMOTE SYSTEM
C12 CACHE
C21 CACHE

FIG. 12
1 HOST COMPUTER
COMMAND
COMMAND
10 LOCAL SYSTEM
20 RELAY SYSTEM
30a FIRST REMOTE SYSTEM
30b SECOND REMOTE SYSTEM
C21 CACHE

FIG. 13
1 HOST COMPUTER
COMMAND
COMMAND
COMMAND
10 LOCAL SYSTEM
20 RELAY SYSTEM
30 REMOTE SYSTEM
C12 CACHE
C21 CACHE

FIG. 14
VIRTUAL VOLUME (V200)
VIRTUAL VOLUME (V100)
REAL VOLUME (R100)

FIG. 15
VIRTUAL VOLUME (V100)
REAL VOLUME (R100)
VIRTUAL VOLUME (V101)

FIG. 16
VIRTUAL VOLUME (V100)
REAL VOLUME (R100)

What is claimed is:

1. A storage system capable of transmitting data stored in a first storage control device to a third storage control device via a second storage control device,
    wherein said second storage control device comprises:
    a first virtual volume which is associated with a real volume and forms a pair with a copy source volume of said first storage control device;
    a second virtual volume which is associated with said real volume and forms a pair with a copy destination volume of said third storage control device;
    a first target port having the input side thereof connected to said copy source volume and the output side thereof connected to said first virtual volume;
    a first initiator port having the input side thereof connected to said first virtual volume;
    a second target port having the input side thereof connected to said first initiator port and the output side thereof connected to said second virtual volume;
    a second initiator port having the input side thereof connected to said second virtual volume and the output side thereof connected to said copy destination volume;
    a first control program for causing said first virtual volume to operate as an auxiliary volume of said copy source volume;
    a second control program for reflecting storage contents of said first virtual volume in storage contents of said second virtual volume; and
    a third control program for causing said second virtual volume to operate as the primary volume of said copy destination volume, and
    wherein said real volume is mapped to said second virtual volume, and said second virtual volume is mapped to said first virtual volume.

2. A storage system capable of transmitting data stored in a first storage control device to a third storage control device via a second storage control device, wherein said second storage control device comprises:

a first virtual volume which is associated with a real volume and forms a pair with a copy source volume of said first storage control device;

a second virtual volume which is associated with said real volume and forms a pair with a copy destination volume of said third storage control device;

a first control unit for reflecting storage contents of said copy source volume in storage contents of said first virtual volume;

a second control unit for reflecting storage contents of said first virtual volume in storage contents of said second virtual volume; and a third control unit for reflecting storage contents of said second virtual volume in storage contents of said copy destination volume, wherein said second control unit reflects storage contents of said first virtual volume in storage contents of said first virtual volume in storage contents of said second virtual volume by copying data stored in said first virtual volume to said second virtual volume via a communication path connecting an initiator port and a target port located in the same housing.

3. A storage system capable of transmitting data stored in a first storage control device to a third storage control device via a second storage control device, wherein said second storage control device comprises:

a first virtual volume which is associated with a real volume and forms a pair with a copy source volume of said first storage control device;

a second virtual volume which is associated with said real volume and forms a pair with a copy destination volume of said third storage control device;

a first control unit for reflecting storage contents of said copy source volume in storage contents of said first virtual volume;

a second control unit for reflecting storage contents of said first virtual volume in storage contents of said second virtual volume;

a third control unit for reflecting storage contents of said second virtual volume in storage contents of said copy destination volume; and a first cache memory which is associated with said first virtual volume for temporarily storing data to be stored in said first virtual volume, and a second cache memory which is associated with said second virtual volume for temporarily storing data to be stored in said second virtual volume, wherein said second control unit reflects storage contents of said first virtual volume in storage contents of said second virtual volume by copying the data stored in said first cache memory to said second cache memory.

4. A storage system capable of transmitting data stored in a first storage control device to a third storage control device via a second storage control device, wherein said second storage control device comprises:

a first virtual volume which is associated with a real volume and forms a pair with a copy source volume of said first storage control device;

a second virtual volume which is associated with said real volume and forms a pair with a copy destination volume of said third storage control device;

a first control unit for reflecting storage contents of said copy source volume in storage contents of said first virtual volume;

a second control unit for reflecting storage contents of said first virtual volume in storage contents of said second virtual volume;

a third control unit for reflecting storage contents of said second virtual volume in storage contents of said copy destination volume; and a second cache memory which is associated with said second virtual volume for temporarily storing data to be stored in said second virtual volume, wherein said second control unit reflects storage contents of said first virtual volume in storage contents of said second virtual volume by directly copying data written in said first virtual volume to said second cache memory.

5. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume; and a third control unit for reflecting storage contents of said second virtual volume in storage contents of said copy destination volume, wherein said real volume is mapped to said second virtual volume, and said second virtual volume is mapped to said first virtual volume.

6. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume; and a third control unit for reflecting storage contents of said second virtual volume in storage contents of said copy destination volume, wherein said first virtual volume and said second virtual volume are independently associated with said real volume.

7. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume; and a third control unit for reflecting storage contents of said second virtual volume in storage contents of said copy destination volume, wherein said control unit reflects storage contents of said first virtual volume in storage contents of said second virtual volume by copying data stored in said first virtual volume to said second virtual volume via a communication path connecting an initiator port and a target port located in the same housing.

8. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume;

a third control unit for reflecting storage contents of said second virtual volume in storage contents of said copy destination volume; and a first cache memory which is associated with said first virtual volume for temporarily storing data to be stored in said first virtual volume, and a second cache memory which is associated with said second virtual volume for temporarily storing data to be stored in said second virtual volume, wherein said second control unit reflects storage contents of said first virtual volume in storage contents of said second virtual volume by copying data stored in said first cache memory to said second cache memory.

9. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume;

a third control unit for reflecting storage contents of said second virtual volume in storage contents of said copy destination volume; and a second cache memory which is associated with said second virtual volume for temporarily storing data to be stored in said second virtual volume, wherein said second control unit reflects storage contents of said first virtual volume in storage contents of said second virtual volume by directly copying data written in said first virtual volume to said second cache memory.

10. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume; and a third control unit for reflecting storage contents of said second virtual volume in storage contents of said copy destination volume, wherein at least either said first virtual volume said second virtual volume is provided in a plurality.

11. A storage control device capable of transmitting data stored in a first storage control device to a third storage control device, said second storage control device comprising:

a first virtual volume which is associated with a real volume and forms a pair with a copy source volume of said first storage control device;

a second virtual volume which is associated with said real volume and forms a pair with a copy destination volume of said third storage control device;

a first control unit for reflecting the storage contents of said copy source volume in storage contents of said first virtual volume;

a second control unit for reflecting storage contents of said first virtual volume in storage contents of said second virtual volume;

a third control unit for reflecting storage contents of said second virtual volume in storage contents of said copy destination volume; and wherein a plurality of said second virtual volumes, these second virtual volumes respectively forming a pair with different copy destination volumes.

12. A data relay method using a storage control device for transmitting data stored in a first storage control device to a third storage control device via a second storage control device, comprising the steps of:

setting a first virtual volume and a second virtual volume, each being associated with a real volume, into said second storage control device;

forming a second pair from said second virtual volume and a copy destination volume of said third storage control device;

synchronizing storage contents of said copy source volume and storage contents of said first virtual volume;

synchronizing storage contents of said first virtual volume and storage contents of said second virtual volume; and synchronizing storage contents of said second virtual volume and storage contents of said copy destination volume.

* * * * *